(12) United States Patent
Taguchi

(10) Patent No.: US 9,756,259 B2
(45) Date of Patent: Sep. 5, 2017

(54) SHOOTING APPARATUS INCLUDING A DIAPHRAGM

(71) Applicant: Olympus Corporation, Shibuya-ku, Tokyo (JP)

(72) Inventor: Yuzuru Taguchi, Tachikawa (JP)

(73) Assignee: Olympus Corporation, Tokyo (JP)

( * ) Notice: Subject to any disclaimer, the term of this patent is extended or adjusted under 35 U.S.C. 154(b) by 6 days.

(21) Appl. No.: 14/935,165

(22) Filed: Nov. 6, 2015

(65) Prior Publication Data

US 2016/0134786 A1    May 12, 2016

(30) Foreign Application Priority Data

Nov. 10, 2014  (JP) ................. 2014-227944

(51) Int. Cl.
| | |
|---|---|
| G03B 13/00 | (2006.01) |
| H04N 5/232 | (2006.01) |
| H04N 5/238 | (2006.01) |
| G02B 5/00 | (2006.01) |
| H04N 5/225 | (2006.01) |
| G03B 13/36 | (2006.01) |
| G02B 7/38 | (2006.01) |
| G03B 9/02 | (2006.01) |

(52) U.S. Cl.
CPC ............. *H04N 5/238* (2013.01); *G02B 5/005* (2013.01); *G03B 13/36* (2013.01); *H04N 5/2254* (2013.01); *H04N 5/23212* (2013.01); *G02B 7/38* (2013.01); *G03B 9/02* (2013.01)

(58) Field of Classification Search
CPC .. H04N 5/144; H04N 5/23212; H04N 5/2254; H04N 5/238

USPC .......................................................... 348/347
See application file for complete search history.

(56) References Cited

U.S. PATENT DOCUMENTS

| | | | | | |
|---|---|---|---|---|---|
| 4,537,487 | A | * | 8/1985 | Taniguchi | ............... G02B 7/36 396/134 |
| 5,319,413 | A | * | 6/1994 | Katoh | ...................... G02B 7/28 396/137 |
| 7,877,006 | B2 | * | 1/2011 | Moriya | .................. G03B 13/36 250/201.7 |
| 2007/0212051 | A1 | * | 9/2007 | Moriya | .................. G03B 13/36 396/147 |
| 2011/0206359 | A1 | * | 8/2011 | Nishimura | ............... G03B 3/10 396/111 |

(Continued)

*Primary Examiner* — Antoinette Spinks
(74) *Attorney, Agent, or Firm* — John C. Pokotylo; Straub & Pokotylo

(57) ABSTRACT

A shooting apparatus comprising: a photographing optical system having a variable aperture diaphragm; an imaging section that outputs an image signal; a diaphragm position detection section that detects a diaphragm position; a lens control section that controls movement of a focus lens; a storage section that stores an amount of focal shift corresponding to the diaphragm position; a focus detection section that detects a peak of a contrast value based on the image signal, wherein the lens control section, while moving the focus lens to a focusing position based on a position at which the contrast value indicates the peak, corrects a position of the focus lens to be moved, on the basis of a diaphragm position when the position at which the contrast value indicates the peak is detected, a diaphragm position while moving the focus lens, and the amount of focal shift stored in the storage section.

7 Claims, 13 Drawing Sheets

(56) References Cited

U.S. PATENT DOCUMENTS

| | | | |
|---|---|---|---|
| 2013/0010137 A1* | 1/2013 | Kawai | H04N 5/23258 348/208.1 |
| 2013/0194485 A1* | 8/2013 | Maruyama | H04N 9/7908 348/345 |
| 2013/0300920 A1* | 11/2013 | Nakamura | H04N 5/2254 348/360 |
| 2013/0314579 A1* | 11/2013 | Sasaki | G02B 7/28 348/333.02 |
| 2014/0079380 A1* | 3/2014 | Taguchi | G02B 7/08 396/63 |
| 2014/0240585 A1 | 8/2014 | Takahara | |
| 2015/0130970 A1* | 5/2015 | Nishio | H04N 5/23296 348/240.3 |
| 2015/0189159 A1* | 7/2015 | Taguchi | G03B 13/36 348/349 |

\* cited by examiner

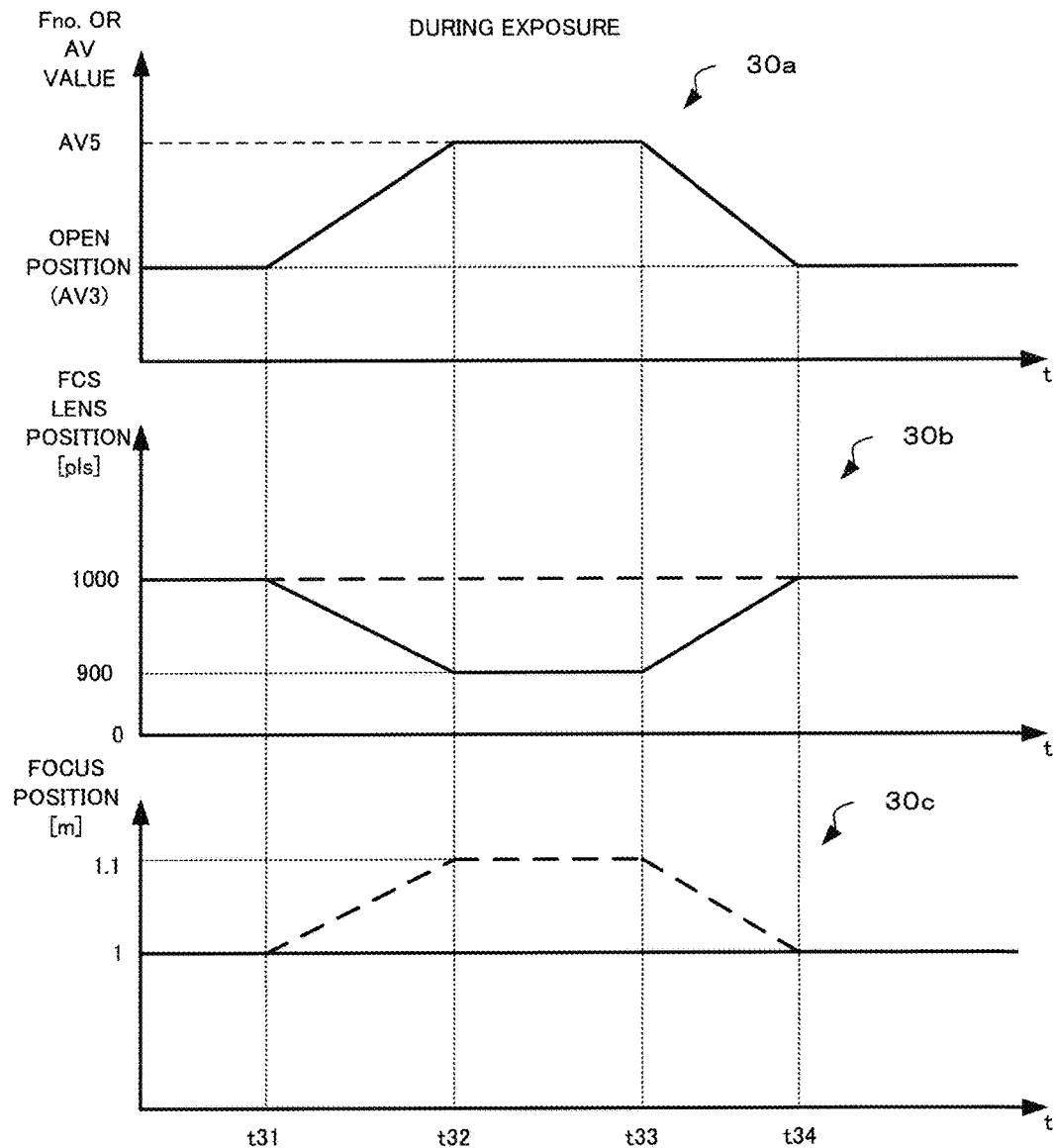

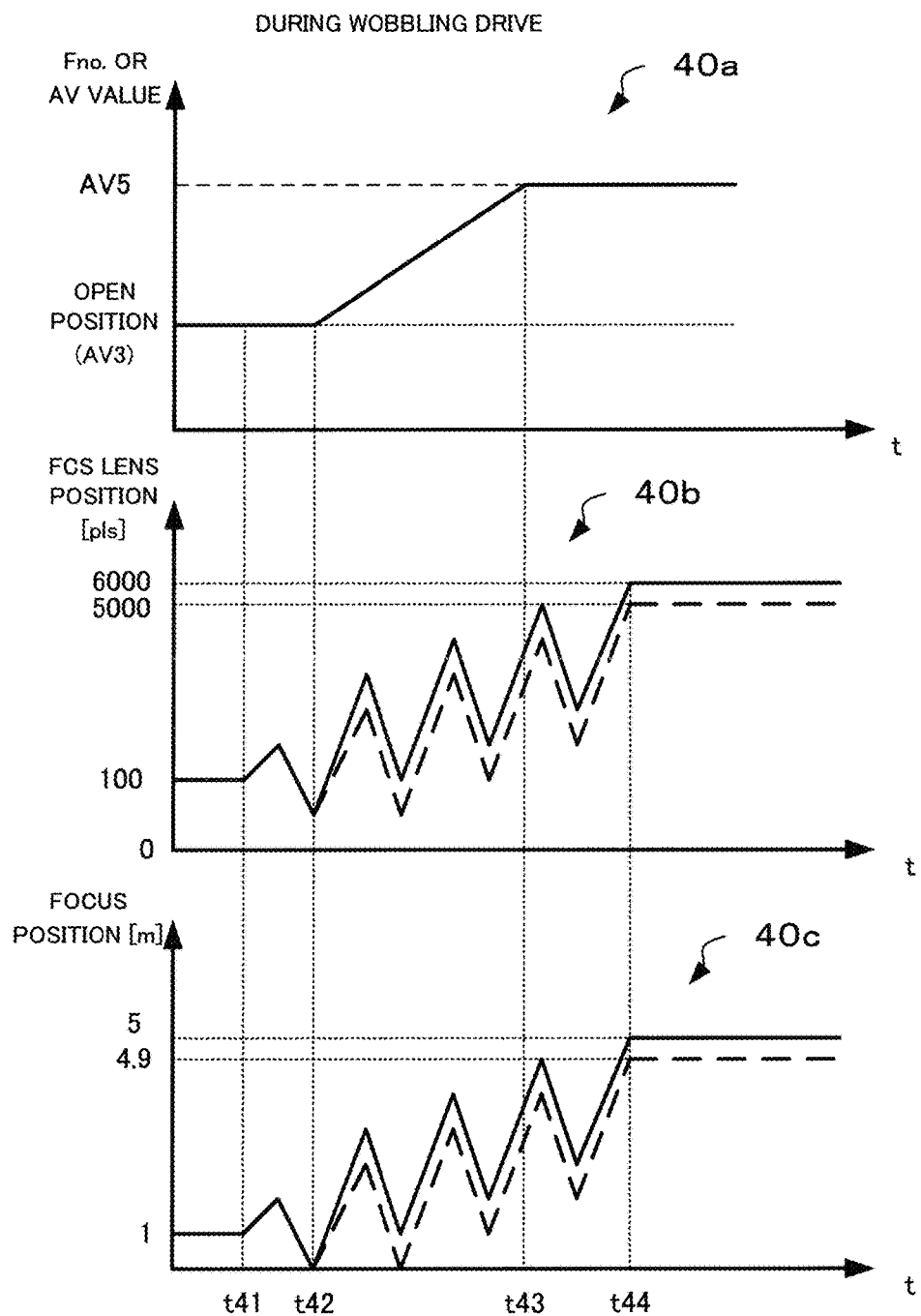

SHOOTING APPARATUS INCLUDING A DIAPHRAGM

Benefit is claimed, under 35 U.S.C. §119, to the filing date of prior Japanese Patent Application No. 2014-227944 filed on Nov. 10, 2014. This application is expressly incorporated herein by reference. The scope of the present invention is not limited to any requirements of the specific embodiments described in the application.

BACKGROUND OF THE INVENTION

1. Field of the Invention

The present invention relates to a shooting apparatus and a camera system capable of performing in-focus shooting, even if the focusing position changes due to a change in the diaphragm opening amount, in the shooting apparatus having a diaphragm provided within a photographing optical system.

2. Description of Related Art

A focusing operation for a photographing optical system is performed in a state where the diaphragm is open, and then, actual shooting is performed after the diaphragm is stopped down to a diaphragm stop that can achieve appropriate exposure, or to a set diaphragm stop. In the case of general photographing optical systems, the focusing position of a focus lens moves due to an effect of, for example, aberration in association with a change in the diaphragm stop, possibly resulting in an image that is not in-focus with the subject. In order to solve this problem, Japanese Patent Application Laid-open Publication No. 2013-057784 (hereinafter, referred to as Patent Literature 1) discloses a shooting apparatus that limits a control range for the diaphragm according to the detected focusing position, thereby obtaining an image that is in-focus with the subject.

With the shooting apparatus disclosed in Patent Literature 1, it is possible to shoot an in-focus image. However, the range of the diaphragm stops is limited in actual shooting. Since the focal shift state and the depth of field are important factors in shooting, usability deteriorates in the case of Patent Literature 1 in which the diaphragm stops are limited.

SUMMARY OF THE INVENTION

An object of the present invention is to provide a shooting apparatus and a camera system, which reduces movement of the focusing position due to a change in the diaphragm stop, regardless of the diaphragm stops, and exhibits improved usability.

A shooting apparatus according to the present invention comprising:
- a photographing optical system having a variable aperture diaphragm, and an imaging section that images a light flux passing through the photographing optical system to output an image signal;
- a diaphragm position detection section that detects a diaphragm position corresponding to the aperture diaphragm in the photographing optical system;
- a lens control section that controls movement of a focus lens included in the photographing optical system;
- a storage section that stores an amount of focal shift corresponding to the diaphragm position; and
- a focus detection section that detects a position of the focus lens at which a contrast value based on the image signal indicates a peak, wherein the lens control section, while moving the focus lens to a focusing position based on the position which is detected by the focus detection section and at which the contrast value indicates the peak, corrects a position of the focus lens to be moved, on the basis of a diaphragm position when the position at which the contrast value indicates the peak is detected, a diaphragm position while moving the focus lens, and the amount of focal shift stored in the storage section.

A camera system according to the present invention including an interchangeable lens with a photographing optical system having a variable aperture diaphragm, and a camera body to and from which the interchangeable lens is attachable and detachable, the camera system comprising:
in the interchangeable lens,
- a diaphragm position detection section that detects a diaphragm position corresponding to the aperture diaphragm in the photographing optical system;
- a lens control section that controls movement of a focus lens included in the photographing optical system; and
- a storage section that stores an amount of focal shift corresponding to the diaphragm position, and in the camera body:
- a main body control section that communicates with the lens control section; and
- a diaphragm position storage section that stores the diaphragm position sent by the lens control section and received by the main body control section, wherein the main body control section sends the stored diaphragm position stored in the diaphragm position storage section, to the lens control section, and
the lens control section corrects a position of the focus lens to be moved, on the basis of the stored diaphragm position, a diaphragm position while moving the focus lens, and the amount of focal shift stored in the storage section.

A camera system according to the present invention comprising an interchangeable lens with a photographing optical system having a variable aperture diaphragm, and a camera body to and from which the interchangeable lens is attachable and detachable, the camera system further comprising:
in the interchangeable lens,
- a diaphragm position detection section that detects a diaphragm position corresponding to the aperture diaphragm in the photographing optical system;
- a lens control section that controls movement of a focus lens included in the photographing optical system; and
- a storage section that stores an amount of focal shift corresponding to the diaphragm position, and in the camera body:
- a main body control section that communicates with the lens control section, wherein the lens control section corrects a position of the focus lens to be moved, on the basis of a diaphragm position before the focus lens is moved, a diaphragm position while moving the focus lens, and the amount of focal shift stored in the storage section.

BRIEF DESCRIPTION OF THE DRAWINGS

FIG. 12 is a timing chart in the case where the drive target position of a focus lens is not changed in the lens barrel according to the embodiment of the present invention.

FIG. 13 is a timing chart in the case where wobbling drive is performed in the lens barrel according to the embodiment of the present invention.

DETAILED DESCRIPTION OF THE PREFERRED EMBODIMENTS

Hereinbelow, description will be made of an example of an embodiment according to the present invention, in which the present invention is applied to a digital camera as an embodiment of the present invention. This digital camera includes a photographing optical system having a variable aperture diaphragm, and an imaging section. This imaging section converts a subject image into image data. On the basis of the converted image data, the subject image is displayed on a display section disposed on the back surface of the main body as a through image. A photographer views the through image display to determine the composition and shutter timing. At the time of a release operation, the image data is recorded in a recording medium. Upon selection of a reproduction mode, the image data recorded in the recording medium can be reproduced on the display section.

Figure 1:
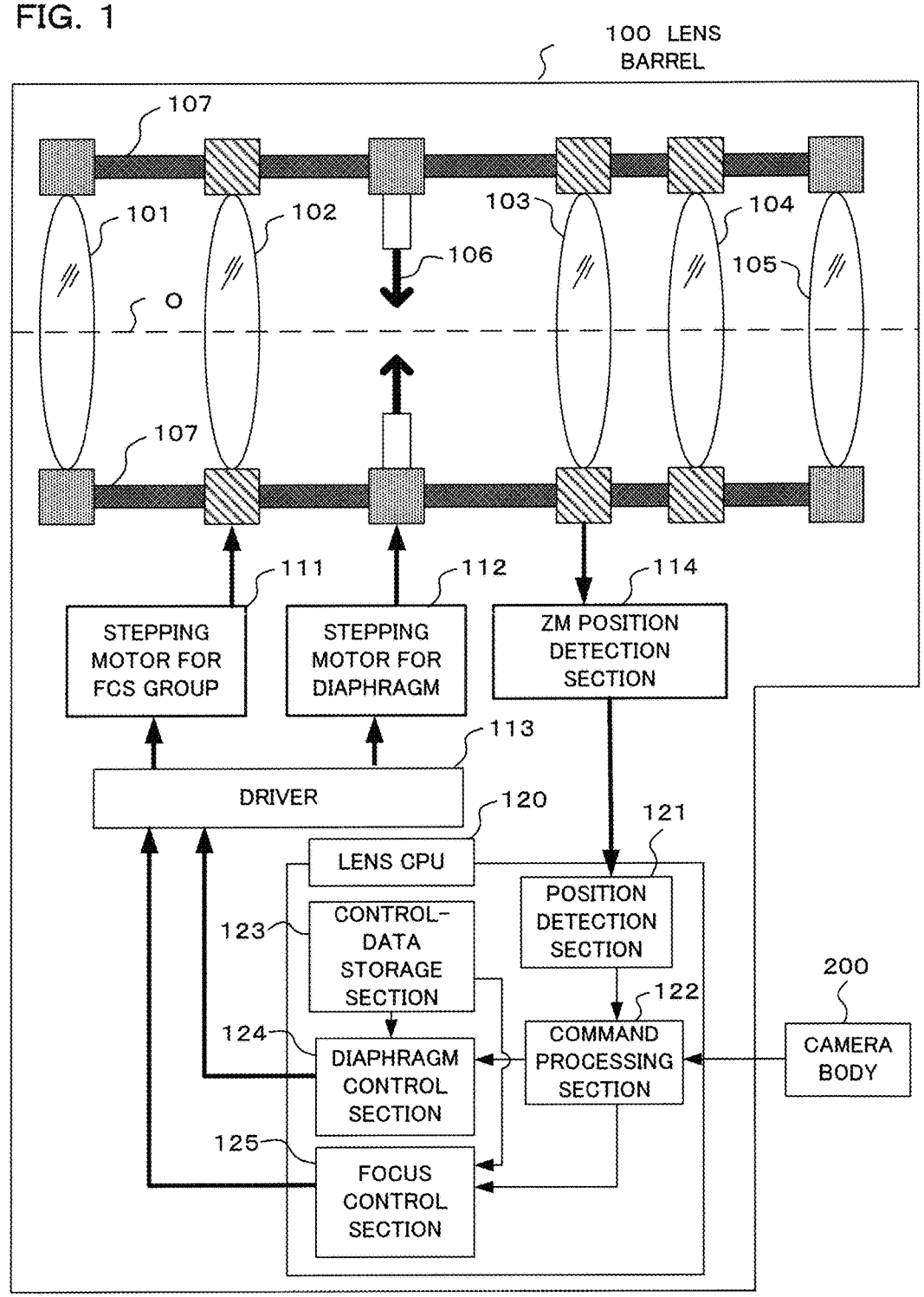
FIG. 1 is a block diagram illustrating a configuration of a lens barrel of a camera according to an embodiment of the present invention.
Figure 2:
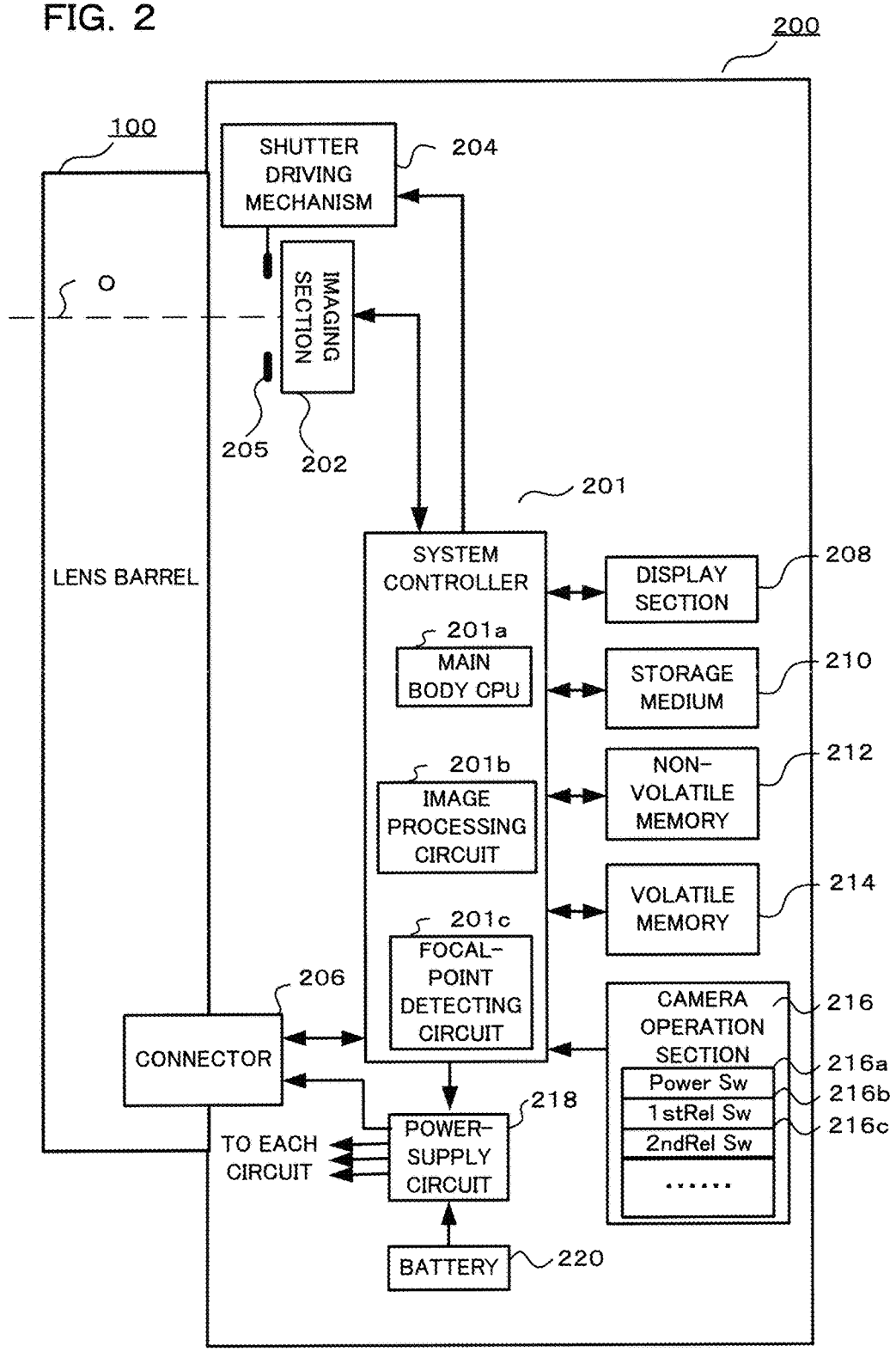
FIG. 2 is a block diagram illustrating a configuration of a camera body of the camera according to the embodiment of the present invention.

FIG. 1 is a block diagram illustrating a configuration of a lens barrel 100 of the camera according to an embodiment of the present invention. FIG. 2 is a block diagram illustrating a configuration of a camera body 200 to which the lens barrel 100 is attached. Note that, in this embodiment, this lens barrel 100 is an interchangeable lens but is not limited to this, and it is obvious that the lens barrel 100 may be a type in which the lens barrel 100 is fixed to the camera body 200.

Within the lens barrel 100, an optical system including a zoom lens group is disposed, and also a diaphragm section that limits a light flux passing through the optical system is disposed. More specifically, within the lens barrel 100, photographing lenses 101 to 105 for forming a subject image and a diaphragm 106 are held by a mirror frame 107. Of these lenses, a focus lens group 102 is used for adjusting focus, and can be moved in an optical axis O direction. Furthermore, a zoom lens group 103 is used for adjusting the focal length, and can be moved in the optical axis O direction. Other lens groups 101, 104, and 105 are fixed to the mirror frame 107, or can be moved in the optical axis O direction.

A diaphragm 106 that has a variable opening size (opening amount) and limits a light flux passing through the optical system is disposed between the focus lens group 102 and the zoom lens group 103. It is obvious that the diaphragm 106 may be located at a position other than the position between the focus lens group 102 and the zoom lens group 103.

The focus lens group 102 can be moved in the optical axis O direction with a stepping motor 111 for the FCS group. The diaphragm 106 is controlled with a stepping motor 112 for the diaphragm so that the opening size thereof is set between the open state and the minimum diaphragm state. As the stepping motors are used, the diaphragm stop and the position of the focus lens 102 can be detected by counting the number of steps of each of the stepping motors after the reference value is detected. It is obvious that the diaphragm position and the position of the focus lens group 102 may be detected with external position detecting means such as a GMR sensor and a photointerrupter.

A driver 113 is connected with the stepping motor 111 for the FCS group and the stepping motor 112 for the diaphragm, and performs drive control of each of the stepping motors. Note that, in this embodiment, the stepping motors are used. However, the configuration is not limited to this, and it is obvious that other actuators such as a voice coil motor may be employed. In the case where a voice coil motor or the like is used, a detection section for detecting the position of the focus lens group 102 or the diaphragm stop of the diaphragm 106 is separately provided to detect them. In this embodiment, the driver 113 and the stepping motor 112 for the diaphragm function as a diaphragm position detection section that detects a diaphragm position corresponding to an aperture diaphragm in the photographing optical system.

Furthermore, the zoom lens group 103 moves in the optical axis O direction in accordance with a manual rotational operation of a zoom ring (not illustrated) provided on the outer periphery of the lens barrel 100 in a freely rotatable manner. Note that it may be possible to provide a driving section (for example, a DC motor, a stepping motor, or a voice coil motor) that drives the zoom lens group 103 in the optical axis O direction, thereby zooming in/out in association with an electrically actuated zooming operation in the lens barrel 100 or the camera body 200.

A zoom (ZM) position detection section 114 detects the position of the zoom lens 103. This position detection may be performed, for example, using an encoder that detects the position of the zoom lens group 103 to detect the absolute position thereof, or may be performed using a combination of a photointerrupter PI (for detecting the relative position) that performs output in response to movement of the zoom lens 103, with a photointerrupter PI (for detecting the absolute position) that detects the reference position, thereby detecting the absolute position.

A lens CPU 120 operates according to a program stored in a storage section (not illustrated) to control the lens barrel 100, in response to a command (instruction to the lens barrel 100) or the like from the camera body 200.

The lens CPU 120 includes a position detection section 121, a command processing section 122, a control-data storage section 123, a diaphragm control section 124, and a focus control section 125. These sections may perform processing through hardware within the lens CPU 120. However, in this embodiment, these sections perform processing through software in accordance with a program stored in the storage section.

The position detection section 121 receives results of detection obtained by the zoom position detection section 114, and detects the position of the zoom lens group 103. The command processing section 122 receives commands sent from the camera body 200, and performs processing in accordance with the commands.

Furthermore, the lens CPU 120 includes a control-data storage section 123 that stores diaphragm control data and the amount of focal shift corresponding to a diaphragm stop. This control-data storage section 123 stores a relationship between the position of the zoom lens group 103 and the opening amount of the diaphragm 106, and a relationship between the diaphragm stop and the amount of focal shift concerning the focus lens group 102. This control-data storage section 123 functions as a storage section that stores the amount of focal shift corresponding to the diaphragm position. Furthermore, the control-data storage section 123 functions as a second storage section that stores the diaphragm position when detecting the position at which the contrast value indicates a peak through a scan operation (see S225 in FIG. 6). Note that the diaphragm position and the diaphragm stop are interchangeable using parameters stored in the control-data storage section 123, and are described as having a similar meaning.

When the command processing section 122 receives from the camera body 200 a command to drive the diaphragm 106, the diaphragm control section 124 drives the stepping motor 112 for the diaphragm through the driver 113 in response to this command to perform drive control of the diaphragm 106. In this drive control, the opening amount of the diaphragm 106 is set on the basis of the relationship between the position of the zoom lens group 103 and the opening amount of the diaphragm 106 stored in the control-data storage section 123, and the position of the zoom lens group 103 detected by the position detection section 121.

When the command processing section 122 receives from the camera body 200 to a command drive the focus lens group 102, the focus control section 125 drives the stepping motor 111 for the FCS group through the driver 113 in response to this command to perform drive control of the focus lens group 102.

The focus control section 125 functions as a lens control section that controls movement of focus lenses included in the photographing optical system. Furthermore, in control of the focus lenses, the focus control section 125 corrects the position of each focus lens to be moved on the basis of the relationship between the diaphragm stop and the amount of focal shift concerning the focus lens group, stored in the control-data storage section 123, the diaphragm position before the focus lens is moved, and the diaphragm position while moving the focus lens (see, for example, S232, S234, and S235 in FIG. 7, and FIG. 10 to FIG. 13).

Figure 10:
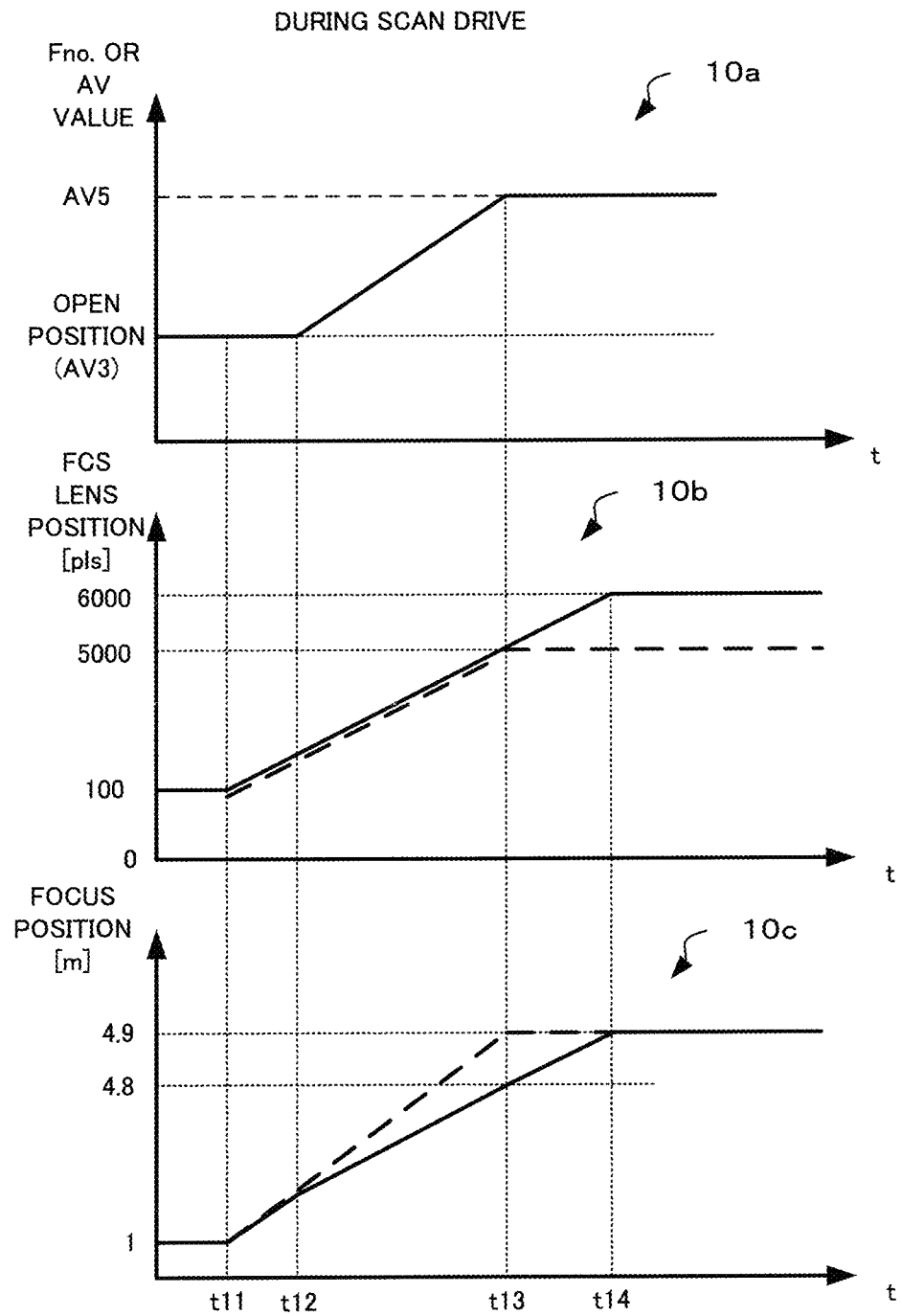
FIG. 10 is a timing chart when scan drive is performed in the lens barrel according to the embodiment of the present invention.

The focus control section 125 functions as an AF control section that performs a scan operation to detect a position at which a contrast value indicates a peak on the basis of image signals outputted by the imaging section while moving the focus lens within a predetermined range (see, for example, FIG. 10). In addition, in the case where the position of the focus lens to be moved is corrected while the scan operation is performed, this focus control section 125 corrects the predetermined range (see, for example, FIG. 10).

Figure 11:
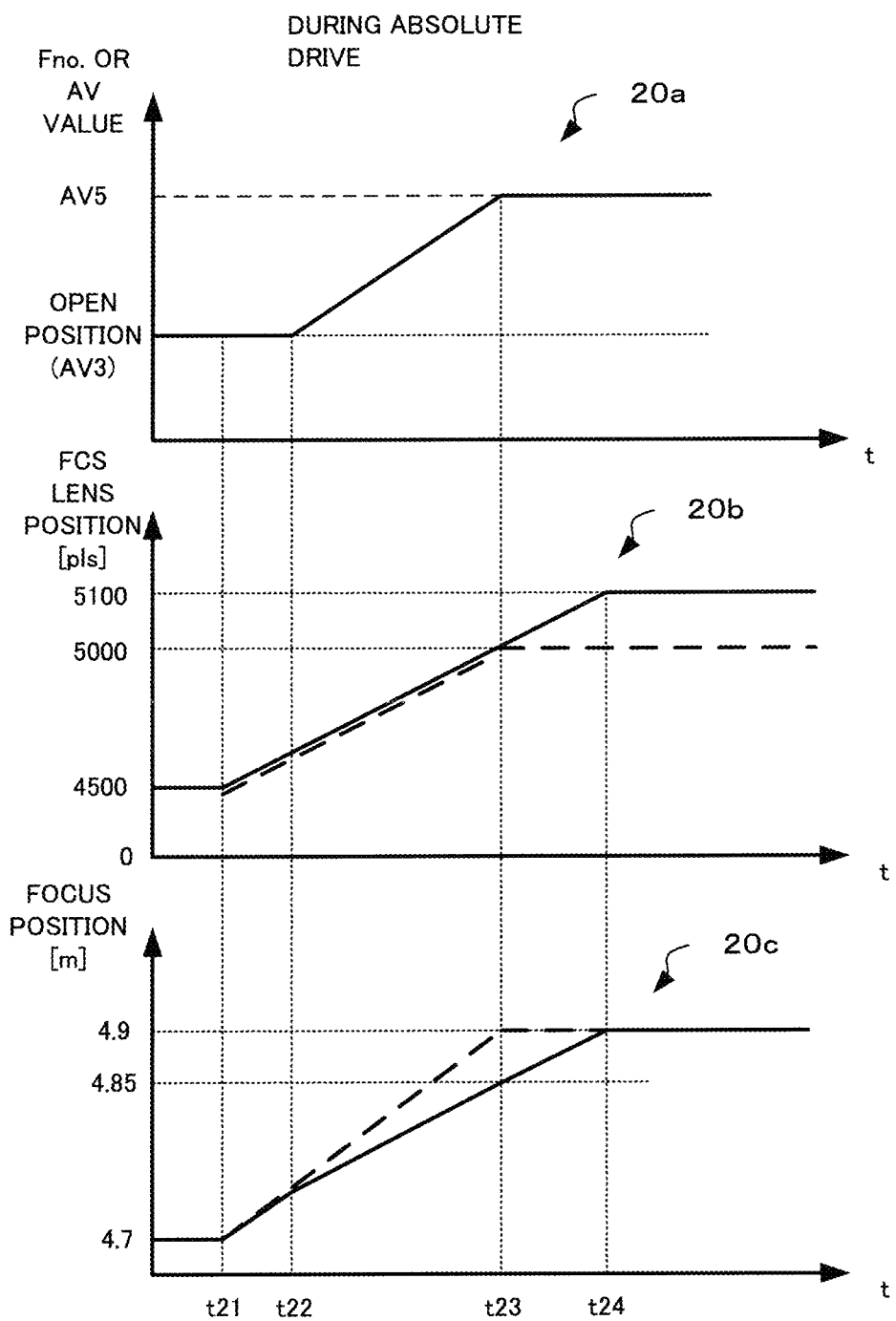
FIG. 11 is a timing chart when absolute drive is performed in the lens barrel according to the embodiment of the present invention.

Furthermore, the focus control section 125 functions as a lens control section that performs a scan operation to detect the position at which the contrast value indicates a peak, on the basis of image signals outputted by the imaging section, while moving the focus lens within a predetermined range (see, for example, FIG. 11). In addition, while the focus lens is moved with the lens control section to a focusing position based on the peak position, this lens control section functions as a lens control section that corrects the position of the focus lens to be moved, on the basis of the diaphragm position at the time when the peak position is detected, the diaphragm position while moving the focus lens, and the amount of focal shift stored in the storage section (see, for example, FIG. 11).

Figure 4:
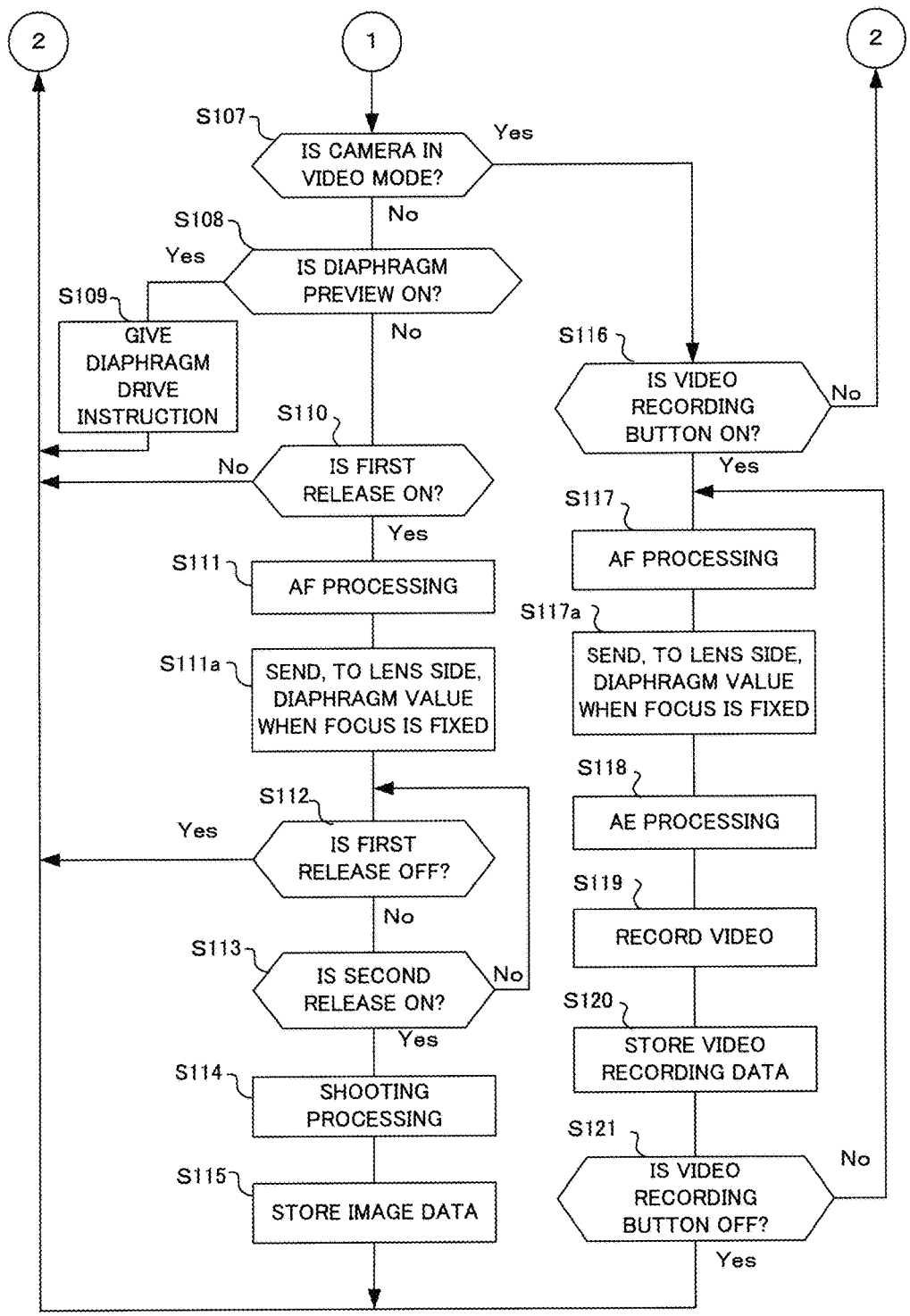
FIG. 4 is a flowchart showing operations performed by the camera body according to the embodiment of the present invention.

Furthermore, the focus control section 125 functions as a lens control section that corrects the position of the focus lens to be moved, on the basis of the stored diaphragm position, the diaphragm position while moving the focus lens, and the amount of focal shift stored in the storage section (see S111a and S117a in FIG. 4, S232, S234, and S235 in FIG. 7, and FIG. 10 to FIG. 13).

Furthermore, the focus control section 125 functions as a lens control section that corrects the position of the focus lens to be moved, on the basis of the diaphragm position before the focus lens is moved, the diaphragm position while moving the focus lens, and the amount of focal shift stored in the storage section (see S232, S234, and S235 in FIG. 7, and FIG. 10 to FIG. 13).

Figure 7:
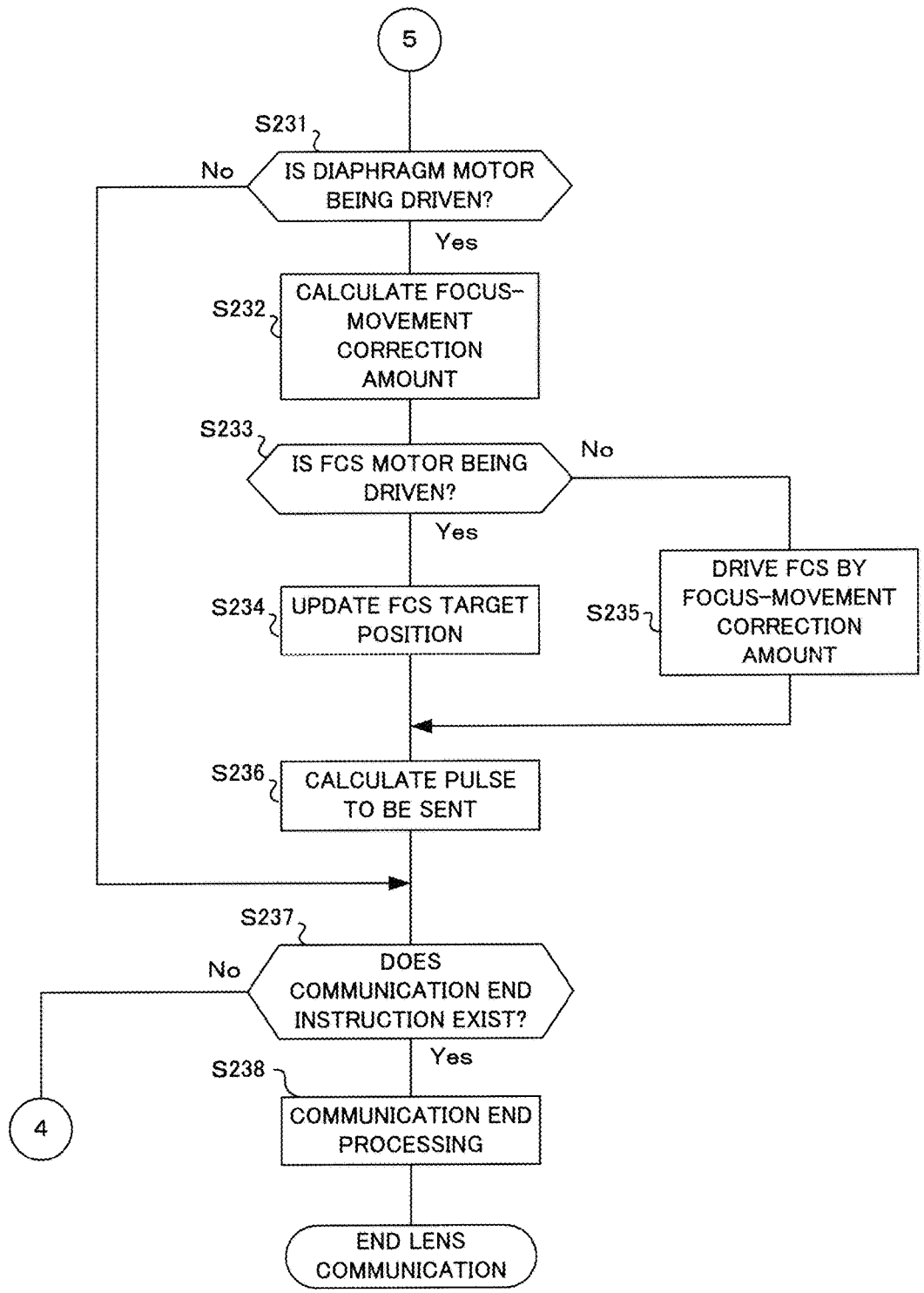
FIG. 7 is a flowchart showing operations performed by the lens barrel according to the embodiment of the present invention.

Furthermore, while the diaphragm position changes, the focus control section 125 functions as a lens control section that sends, to the main body control section, the position of the focus lens, and the position of the focus lens in which the focal shift due to the change in the diaphragm position has been corrected (see S236 in FIG. 7).

The lens barrel 100 and the camera body 200 are electrically connected through a connector 206. More specifically, the lens CPU 120 can communicate with a main body CPU 201a provided within a system controller 201 through the connector 206, and power supply from the power-supply circuit 218 is supplied to the lens barrel 100.

Furthermore, a shutter 205 and an imaging section 202 are disposed on the optical axis O of the optical system within the lens barrel 100 and in the camera body. At the time of shooting, with a shutter driving mechanism 204, the shutter 205 allows a subject light flux to pass through on the basis of control signals from the system controller 201 during a period of time determined by a shutter second time. At the time when a through image is displayed, the shutter 205 is open.

The imaging section 202 includes imaging elements, and an imaging control section, and photoelectrically converts a subject image formed by the optical system within the lens barrel 100 to output the image data to the system controller 201. The imaging section 202 performs control of charge accumulation, reading or the like of the imaging elements, on the basis of the control signals from the system controller 201. The imaging section 202 functions as an imaging section that images a light flux passing through the photographing optical system to output image signals.

The system controller 201 is connected with a display section 208, a storage medium 210, a non-volatile memory 212, a volatile memory 214, a camera operation section 216, and a power-supply circuit 218.

The display section 208 includes, for example, a display monitor or an electronic viewfinder disposed on the back surface or the like of the camera body 200, and displays a through image on the basis of the image data from the imaging section 202. In addition, the display section 208 reads the image data recorded in the storage medium 210, and performs reproduction display of recorded images. Moreover, the display section 208 performs screen display for setting various modes or making adjustment, such as a menu screen.

The storage medium 210 is an electrically rewritable non-volatile memory, such as a loadable memory card. A photographer fully depresses a release button to give an instruction of actual shooting, thereby obtaining image data. The image data thus obtained is image-processed for image recording, and then the storage medium 210 records the image-processed image data.

The non-volatile memory 212 is an electrically rewritable memory, such as a flash ROM. The non-volatile memory 212 stores a program for use in the main body CPU 201 to control the entire camera, and also stores adjustment values or the like for the camera system.

The volatile memory 214 is an electrically rewritable memory, such as a DRAM or an SDRAM. The volatile memory 214 temporarily stores the image data (image-processed in an image processing section 201b) from the imaging section 202. In addition, the volatile memory 214 is used, for example, as a work memory of the main body CPU 201a. The non-volatile memory 212 or the volatile memory 214 functions as a diaphragm position storage section that stores the diaphragm position sent from the lens control section and received by the main body control section (see S111a and S117a in FIG. 4).

The camera operation section 216 includes operation members for a photographer to give various instructions to the camera. The camera operation section 216 detects operational states concerning these operation members, and outputs the results of detection to the system controller 201. The system controller 201 controls the camera system on the basis of the detection signals from the camera operation section 216.

The operation members in the camera operation section 216 include, for example, a power switch 216a, a first release switch 216b, a second release switch 216c, a shooting mode dial, a diaphragm preview button, and a video recording button. The power switch 216a is a switch for starting operations of the camera system. The first release switch 216b is a switch that becomes ON in a half-depressed state of the release button. The second release switch 216c is a switch that becomes ON in a fully-depressed state of the release button.

The power-supply circuit 218 is connected with a battery 220, and stabilizes the power-supply voltage from the battery 220 to be a service voltage, and supplies it to each section in the camera system.

The system controller 201 includes the main body CPU 201a, the image processing circuit 201b, and a focus detecting circuit 201c. The image processing circuit 201b performs various image processing for through-image display or image recording on image data sent from the imaging section 202.

The focus detecting circuit 201c uses the image data sent from the imaging section 202 to extract high frequency component of the image data, thereby calculating a contrast value. The focus lens group 102 in the lens barrel 100 is moved to the focusing position so that this contrast value takes a peak value. The focus detecting circuit 201c functions as a focus detection section that detects contrast values on the basis of the image signal, and also functions as a focus detection section that detects the position of the focus lens at which the contrast value based on the image signal indicates the peak.

The main body CPU 201a controls each section in the entire camera system according to a program stored in the non-volatile memory 212. The main body CPU 201a can communicate with the lens CPU 120 within the lens barrel 100, and controls each section in the lens barrel 100 through the lens CPU 120. The main body CPU 201a functions as a main body control section that communicates with the lens control section. This main body control section sends the stored diaphragm position stored in the diaphragm position storage section, to the lens control section.

Next, operations performed by the camera body 200 according to this embodiment will be described with reference to the flowcharts shown in FIG. 3 and FIG. 4. The main body CPU 201a provided in the camera body 200 executes these flows in accordance with a program stored in the non-volatile memory 212.

Figure 3:
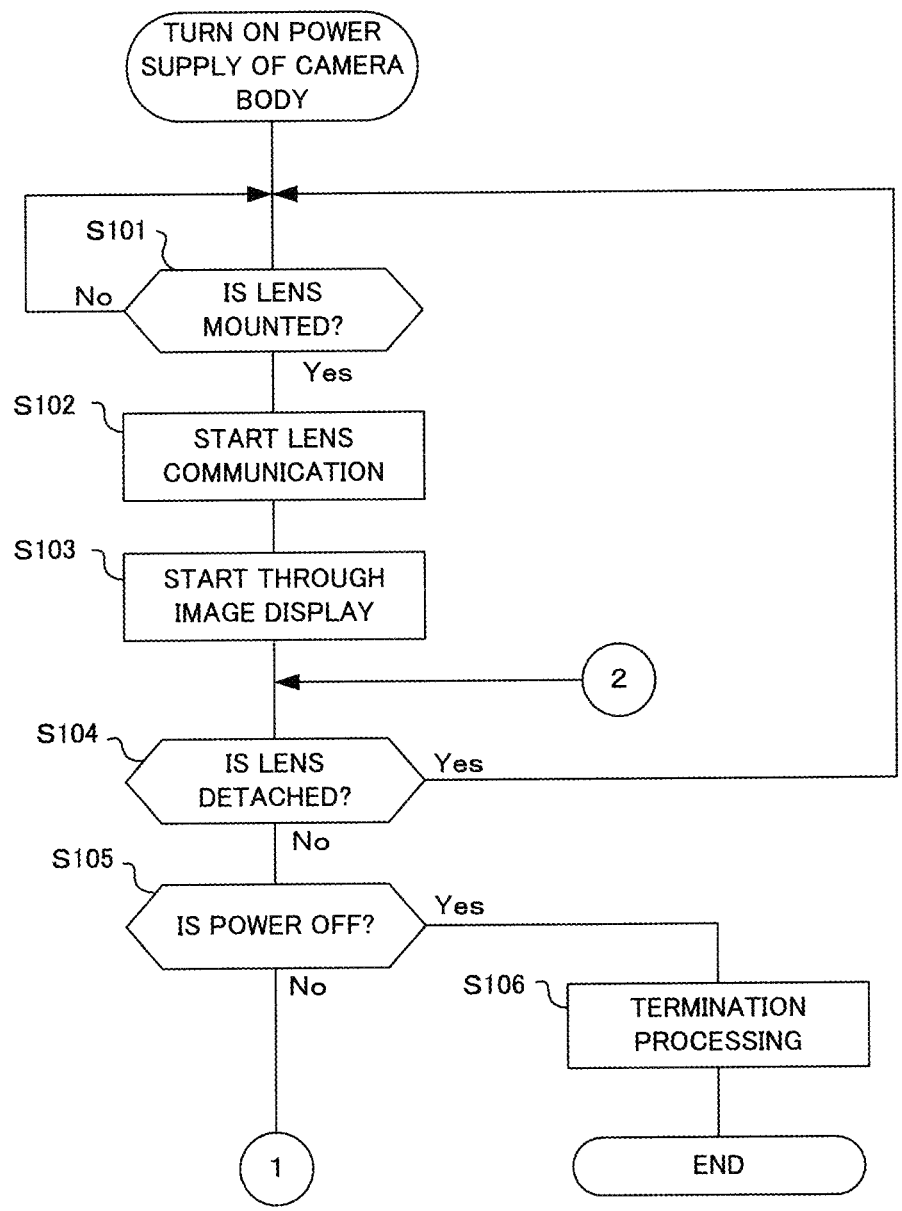
FIG. 3 is a flowchart showing operations performed by the camera body according to the embodiment of the present invention.

The flows shown in FIG. 3 and FIG. 4 start when the power switch 216a is turned on to power on the camera body 200. First, it is determined whether a lens is mounted or not (S101). Here, mount of the lens barrel 100 is determined on the basis of a mount detecting switch (not illustrated) provided to the camera body 200. Note that, it may be determined on the basis of not only the switch but also whether or not the main body CPU 201a in the camera body 200 can communicate with the lens CPU 120 of the lens barrel 100.

Next, lens communication starts if the lens is determined to be mounted, as a result of the determination in step S101 (S102). Here, communication starts between the main body CPU 201a within the camera body 200 and the lens CPU 120 within the lens barrel 100 through a communication section using a known method.

Next, display of a through image starts (S103). Here, display of a through image (also referred to as a live view image) on the display section 208 starts on the basis of image data from imaging elements provided within the camera body 200.

After the display of the through image starts, it is determined whether the lens is detached or not (S104). Here, it is determined whether or not the lens barrel 100 is detached from the camera body 200 on the basis of a state of a lens mounting switch or the like. If the lens is determined to be detached as a result of this determination, the flow returns to step S101.

On the other hand, if it is determined as a result of determination in step S104 that the lens is not detached (in other words, the lens remains mounted), it is then determined whether power supply is OFF or not (S105). Here, it is determined on the basis of an operation state of the operation members such as a power switch provided to the camera body 200. If the power supply is determined to be OFF as a result of this determination, termination processing is performed (S106), and this flow ends.

On the other hand, if it is determined as a result of the determination in step S105 that power supply is not OFF (if power supply remains ON), it is then determined whether the camera is in a video mode or not (S107). For example, it is determined whether or not a photographer has set the camera to the video mode, for example, by switching the shooting mode dial to the video mode.

If it is determined as a result of the determination in step S107 that the camera is not in the video mode, it is then determined whether diaphragm preview is ON or not (S108). In general, the diaphragm 106 is in an open state while a through image is displayed. However, in this state, it is not possible to check the depth of field in a state where the size of the diaphragm is reduced. To solve this problem, in this embodiment, the operation member for operating the diaphragm preview, such as a diaphragm preview button, is provided. If this operation member is operated, diaphragm preview is executed to set the diaphragm 106 to be a diaphragm stop, which is manually or automatically set.

If the diaphragm preview is determined to be ON as a result of the determination in step S108, a diaphragm drive instruction is given (S109). Here, the main body CPU 201a within the camera body 200 outputs a command for the diaphragm drive instruction to the lens CPU 120 within the lens barrel 100. Once the lens CPU 120 receives this command, preview is executed in steps S221 to S224 (see FIG. 6). After the diaphragm drive instruction is executed, the flow returns to step S104.

If it is determined as a result of the determination in step S108 that the diaphragm preview is not turned on, it is then determined whether a first release switch is OFF or not (S110). When a photographer determines a composition to some degree while viewing the through image, the release button is depressed halfway down as a preparation for shooting. In response to the half-depressing operation of the release button, the first release switch 216b is turned on. In this step, it is determined whether the first release switch 216b is ON or not. If it is determined as a result of this determination that the first release switch 216b is not turned on, in other words, if the release button is not depressed halfway down, the flow returns to step S104.

If the first release switch is determined to be ON as a result of the determination in step S110, in other words, if the release button is depressed halfway down, AF processing is performed (S111). Here, contrast AF or the like is performed on the basis of image data from the imaging section 202 within the camera body 200, to adjust a focus. At this time, the main body CPU 201a within the camera body 200 outputs a command for driving the focus lens group 102, to the lens CPU 120 within the lens barrel 100, to adjust a focus.

Note that, more specifically, in the AF processing, for example, executed are: scan drive, called a hill-climbing AF, for detecting the focus lens position at which a contrast indicates a peak; absolute drive in which the focus lens is driven to this peak position to achieve focusing; and a wobbling drive in which the focus lens is moved in the optical axis direction with a predetermined amplitude to detect a contrast at each end point of the amplitude.

After the AF processing, the diaphragm stop at the time when focus is fixed is sent to the lens side (S111a). In the case where the lens barrel 100 is mounted to the camera body 200, the lens communication is performed between the camera body 200 and the lens barrel 100 at every predetermined time after the lens communication is started in step S102, and information on the diaphragm stop of the diaphragm 106 is sent from the lens barrel 100. In addition, a synchronization signal is sent from the camera body 200 to the lens barrel 100. Each block within the lens barrel 100 acquires the focus lens position, the diaphragm position, and the zoom position at the timing of this synchronization signal. In this step, information on the diaphragm stop of the diaphragm 106 at the time when the contrast value indicates the peak during focus adjustment, for example, through the contrast AF is sent to the lens CPU 120 within the lens barrel 100. More specifically, the focus detecting circuit 201c detects a contrast value while moving the focus lens, and the diaphragm stop detected at the time when the contrast value indicates the peak is used as the stored diaphragm position.

After the diaphragm stop at the time when focus is fixed is sent to the lens barrel side, it is determined whether the first release switch is OFF or not (S112). Here, after a photographer depresses the release button halfway down in step S110, it is determined whether or not a finger of the photographer is moved away from the release button. If the first release switch 216b is determined to be OFF as a result of the determination, the flow returns to step S104.

On the other hand, if it is determined as a result of the determination in step S112 that the first release switch is not OFF, in other words, if half-depressing of the release button continues, it is then determined whether the second release switch is ON or not (S113). The photographer depresses the release button halfway down to adjust a focus and determine the composition while viewing the through image, thereby performing shooting. In this case, the photographer fully depresses the release button (in a state of being further depressed than half depressing). In response to full-depressing operation of the release button, the second release switch 216c is turned on. In this step, it is determined whether the second release switch 216c is ON or not. If it is determined that the second release switch is not ON as a result of this determination, in other words, if the release button remains half-depressed and is not fully depressed, the flow returns to step S112.

If the second release switch is determined to be ON as a result of the determination in step S113, shooting processing is performed (S114). Here, the main body CPU 201a of the camera controls the diaphragm 106 and the shutter so as to achieve appropriate exposure, and acquires image data on a still image from the imaging section 202, and the image processing circuit 201b applies image processing for recording, to the image data.

Upon completion of the shooting processing, the image data is stored (S115). Here, the image data image-processed for recording in the shooting processing in step S114 is recorded in the storage medium 210 in the camera body. Upon completion of storing the image data, the flow returns to step S104.

If the camera is determined to be in the video mode as a result of the determination in step S107, it is then determined whether the video recording button is ON or not (S116). In order to view a through image and start video shooting, the photographer operates the video recording button. Thus, in this step, this determination is made on the basis of the operational state of the video recording button. If it is determined that the video recording button is not operated as a result of this determination, the flow returns to step S104.

On the other hand, if the video recording button is determined to be ON as a result of the determination in step S116, AF processing is performed (S117). In the AF processing, contrast AF or the like is performed on the basis of image data from the imaging elements within the camera body 200, to adjust a focus. At this time, the main body CPU within the camera body 200 outputs a command for driving the focus lens group 102 to the lens CPU 120 within the lens barrel 100, to adjust a focus. In the AF processing in step S117, a so-called continuous AF (if focal shift occurs after focusing, automatic focus adjustment is performed again to continuously maintain the focusing state) is performed, although so-called single AF (once focus is adjusted, the focus adjustment operation ends) may be employed in the AF processing in step S111.

Upon completion of the AF processing, the diaphragm stop at the time when focus is fixed is sent to the lens side (S117a). In this step, as in step S111a, information on the diaphragm stop of the diaphragm 106 at the time when the contrast value indicates the peak when focus is adjusted through the contrast AF or the like is sent to the lens CPU 120 within the lens barrel 100. In other words, the diaphragm stop detected by the diaphragm position detection section at the time when the main body control section fixes the focusing state is determined to be the stored diaphragm position.

After the diaphragm stop at the time when focus is fixed is sent to the lens barrel side, AE processing is performed (S118). Here, the diaphragm 106, an electronic shutter of the imaging elements, the ISO speed and the like are controlled so that appropriate exposure is achieved on the basis of brightness information acquired based on the image data from the imaging elements within the camera body 200. To control the diaphragm 106, the main body CPU 201a outputs a command for controlling the diaphragm, to the lens CPU 120.

Upon completion of the AE processing, video recording is performed (S119) to store video recording data (S120). Here, image data for video recording is acquired from the imaging elements and image-processed for video recording. The processed image data is recorded in the storage medium 210 within the camera body.

After the video recording data are stored, it is then determined whether the video recording button is OFF or not (S121). Here, it is determined whether the video recording button, which has been made ON in step S116, is OFF, in other words, it is determined whether depressing of the video recording button is released or not. Note that, in this embodiment, video is recorded while the video recording button is being depressed. However, the embodiment is not limited to this, and for example, video recording may start when the video recording button is depressed; video recording may continue thereafter even if a finger is moved away from the video recording button; and video recording may end when the video recording button is depressed again.

If it is determined as a result of the determination in step S121 that the video recording button is not OFF, in other words, if operation to the video recording button is kept, the flow returns to step S117, and video recording continues. On the other hand, if the video recording button is determined to be OFF as a result of the determination in step S121, in other words, if operation to the video recording button is cancelled, video recording ends, and the flow returns to step S104.

Next, operations performed by the lens barrel 100 according to this embodiment will be described with reference to the flowcharts in FIG. 5 to FIG. 7. The lens CPU 120 provided in the lens barrel 100 executes these flows in accordance with a program stored in a storage section (not illustrated) within the lens barrel 100.

Figure 5:
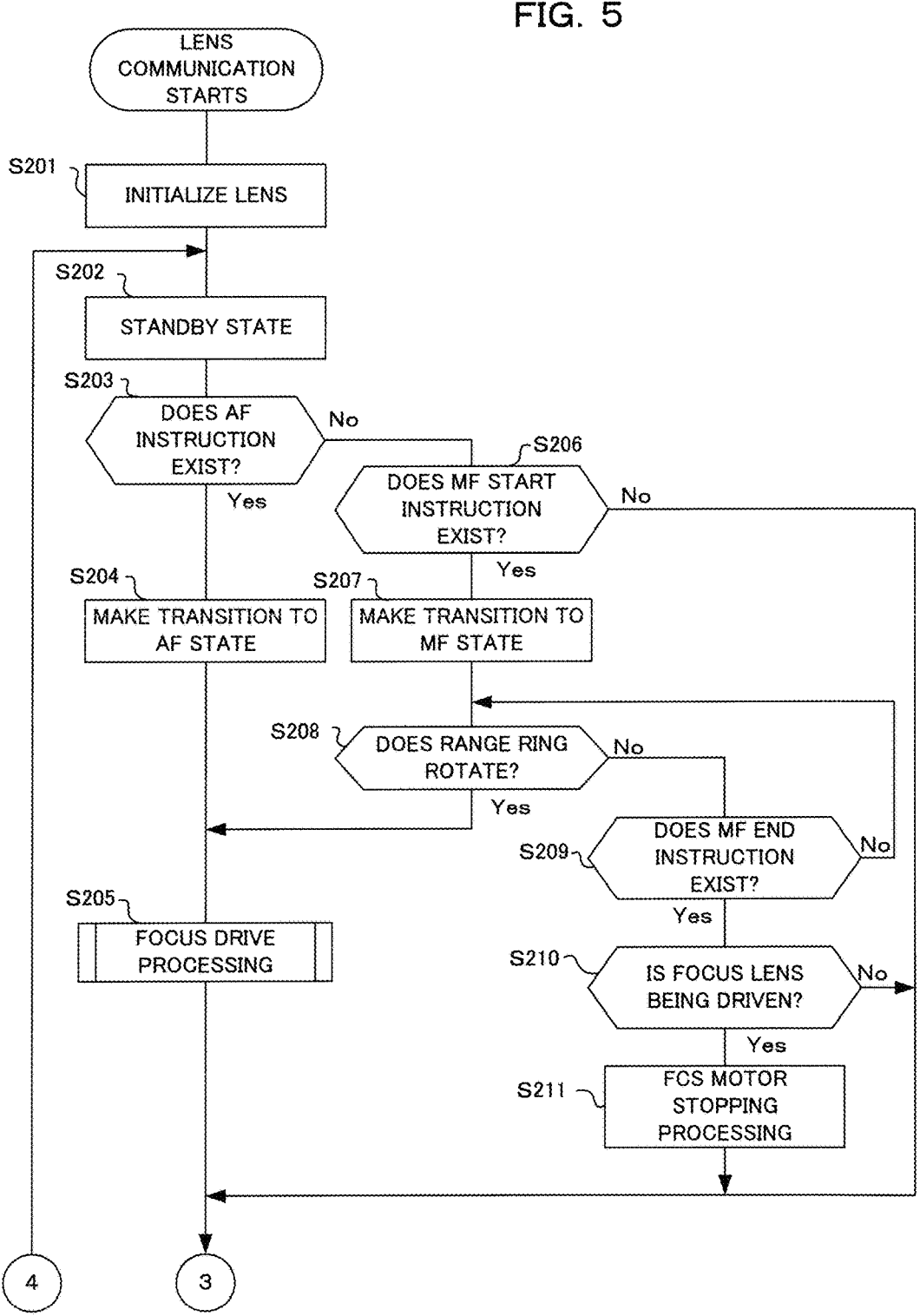
FIG. 5 is a flowchart showing operations performed by the lens barrel according to the embodiment of the present invention.
Figure 6:
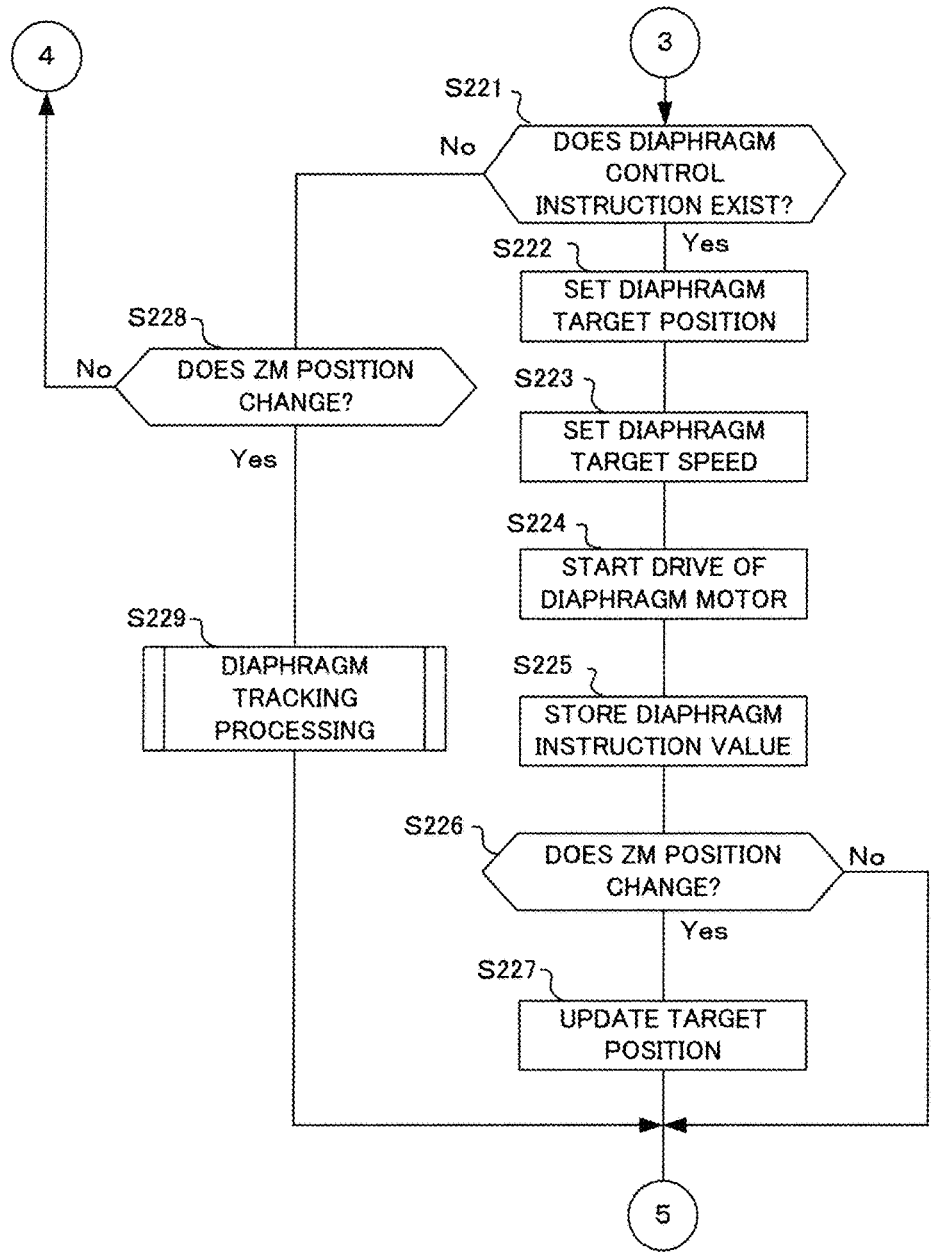
FIG. 6 is a flowchart showing operations performed by the lens barrel according to the embodiment of the present invention.

The flows shown in FIG. 5 to FIG. 7 start when power within the camera body 200 is turned on, and the lens barrel 100 is powered on, accordingly. First, the lenses are initialized (S201). Here, mechanical initialization is performed so that the photographing lenses 101 to 105, the diaphragm 106 and the like are located at the initial positions, and electrical initialization for, for example, various flags is performed.

After the lenses are initialized, the lens barrel is put into a standby state (S202). If the lens barrel 100 does not receive any command to instruct operations from the camera body 200, or if there is no operation of the operation members provided to the lens barrel 100, such as a zoom ring or a range ring, the lens barrel 100 does not start its operation. In this step, the lens barrel 100 waits, for example, for reception of a command from the camera body 200, and if a command is received or the operation member is operated, the flow proceeds to step S203.

After the standby state is exited, it is determined whether or not an AF instruction exists (S203). When the camera body 200 performs the AF processing, for example, in step S111 or S117, a command to drive the focus lens group 102 is sent to the lens CPU 120 in response to focus detection on the main body side. In this step, determination is made on the basis of whether the command for this AF instruction is received.

If the AF instruction is determined to exist as a result of the determination in step S203, the state transitions to the AF state (S204), and focus drive is performed (S205). Here, the command processing section 122 transitions to the AF state, and the focus control section 125 performs drive control of the stepping motor 111 for the FCS group at a target speed toward a target position in accordance with the instruction from the camera body 200. Operations of the focus drive processing in step S205 will be described later in detail with reference to FIG. 8.

If it is determined as a result of the determination in step S203 that the AF instruction does not exist, it is then determined whether or not a MF start instruction exists (S206). The focus of the lens barrel 100 can be adjusted through two types of adjustment: AF (automatic focus adjustment) and MF (manual focus adjustment). These types can be set on the camera body 200 side. In this step, determination as to whether or not the MF mode is set on the camera body 200 side is made on the basis of a command from the camera body side.

If the MF start instruction is determined to exist as a result of the determination in step S206, the state transitions to the MF state (S207), and it is determined whether or not the range ring (not illustrated) has rotated (S208). Here, the command processing section 122 transitions to the MF state, and executes MF (manual focus adjustment) according to the rotational direction and rotation amount of the freely rotatable range ring provided on the outer periphery of the lens barrel 100. If the range ring is determined to have rotated as a result of the determination in step S208, the flow proceeds to step S205, and the manual focus adjustment is performed according to the detected rotational direction and rotation amount.

If it is determined as a result of the determination in step S208 that the range ring has not rotated, it is then determined whether or not a MF end instruction exists (S209). Here, determination as to whether or not setting of the MF mode is cancelled on the camera body side is made on the basis of a command from the camera body side. If the MF end instruction is determined to exist as a result of this determination, the flow returns to step S208, and the MF mode continues.

If the MF end instruction is determined to exist as a result of the determination in step S209, it is then determined whether or not the focus lens is being driven (S210). When the range ring is operated in step S208, the stepping motor 111 for the FCS group drives the focus lens group 102. However, there is a delay in driving the focus lens group 102 relative to the movement of the range ring. Thus, even if the MF end instruction exists, there is a possibility that driving the focus lens group 102 is not completed.

If the focus lens is determined to be being driven as a result of the determination in step S210, processing to stop the stepping motor 111 for the FCS group is performed (S211).

If the focus drive processing is performed in step S205, or if it is determined as a result of the determination in S206 that the MF start instruction does not exist, or if it is determined as a result of the determination in step S210 that the focus lens is not being driven, or if the processing to stop the FCS motor is performed in step S211, it is then determined whether or not a diaphragm control instruction exists (S221). The camera body 200 outputs, to the lens CPU 120, a command for the diaphragm control instruction, for example, at the time of a diaphragm drive instruction during diaphragm preview in step S109, at the time of shooting processing in step S114, and at the time of the AE processing during video recording in step S118. In this step S221, it is determined whether or not the command for this diaphragm control instruction is sent.

If the diaphragm control instruction is determined to exist as a result of the determination in step S221, the diaphragm target position is then set (S222), the diaphragm target speed is set (S223), and the diaphragm motor drive is started (S224). In the case where the camera body 200 outputs a command for the diaphragm control instruction to the lens CPU 120, the camera body 200 sends a diaphragm stop to be set. Thus, the number of drive steps required to reach the received diaphragm stop from the current diaphragm stop is calculated on the basis of the diaphragm stop to be set, the current focal length, and the stored values in the control-data storage section 123 that stores the relationship between the position of the zoom lens group 103 stored in the control-data storage section 123 and the opening amount of the diaphragm 106, whereby the diaphragm target position is set. Then, the diaphragm target speed at which drive is performed for the set target position is set. After the diaphragm target position and the diaphragm target speed are set, the diaphragm drive control to the diaphragm 106 starts using the diaphragm motor (stepping motor 112 for the diaphragm).

When drive of the diaphragm motor is started, a diaphragm instruction value is then stored (S225). Here, a diaphragm instruction value set in the command for the diaphragm control instruction sent from the camera body 200 is stored in the control-data storage section 123. This is because a photographer may perform zoom operation before the diaphragm control is completed. Even in such a case, the opening size of the diaphragm 106 needs to be controlled so as to be the diaphragm stop instructed by the camera body 200 (see steps S226 and S227). In addition, as the diaphragm stop also changes, the focusing position in the optical system changes. Thus, the amount of correction of the focusing position is calculated using this stored diaphragm stop as described later (see S232).

After the diaphragm instruction value is stored, it is then determined whether or not a zoom (ZM) position has changed (S226). Here, it is determined whether or not the photographer has rotated the zoom ring (or a zoom operation member on the camera body side), and the focal length has changed. The determination as to whether the focal length has changed may be made, for example, on the basis of temporal change in the focal length detected by the zoom position detection section 114.

If the zoom position is determined to have changed as a result of the determination in step S226, the target position is updated (S227). If the focal length changes, the opening size of the diaphragm 106 needs to be changed to achieve the diaphragm stop instructed by the camera body 200. In this step, the diaphragm target position set in step S222 is changed so as to achieve the diaphragm stop instructed by the camera body 200.

If it is determined as a result of the determination in step S221 that the diaphragm control instruction does not exist, it is then determined whether or not the zoom (ZM) position has changed (S228). As described above, in the case where the zoom ring or the like provided to the lens barrel 100 is operated, the focal length of the optical system changes. In this step, it is determined whether or not the zoom position has changed, for example, on the basis of temporal change in the focal length detected by the zoom position detection section 114. If it is determined that the zoom position has not changed as a result of this determination, the flow returns to step S202.

If the zoom position is determined to have changed as a result of the determination in step S228, diaphragm tracking processing is then performed (S229). Here, the opening amount (opening size) of the diaphragm 106 is controlled so that the diaphragm stop instructed from the camera body 200 side is maintained even if the focal length changes due to zoom operation. Operations of this diaphragm tracking processing will be described later in detail with reference to FIG. 9.

After the diaphragm tracking processing is performed in step S229, or if it is determined as a result of the determination in step S226 that the zoom position has not changed, or if the target position is updated in step S227, it is then determined whether the diaphragm motor is being driven or not (S231). This determination is made on the basis of the state of the diaphragm drive of the stepping motor 112 for the diaphragm within the lens barrel 100.

If the diaphragm motor is determined to be being driven as a result of the determination in step S231, the focus-movement correction amount is calculated (S232). As described above, the focusing position of the optical system of the photographing lenses changes with a change in the diaphragm stop. On the main body side, in step S111a or S117a, the diaphragm stop at the time when focus is fixed is acquired and sent to the lens side. On the lens side, the diaphragm stop at the time when focus is fixed is received and stored in the control-data storage section 123, and the diaphragm instruction value is stored in step S225. In this step, a change in the diaphragm stop is acquired from these stored diaphragm stops, and the amount of correction of the focusing position of the optical system is calculated in accordance with the change in the diaphragm stop.

Upon completion of calculating the focus-movement correction amount, it is then determined whether the FCS motor is being driven or not (S233). Here, this determination is made on the basis of the drive state of the stepping motor 111 for the FCS group, which is configured to drive the focus lens group 102.

If the FCS motor is determined to be being driven as a result of the determination in step S233, the FCS target position is updated (S234). The drive target position of the focus lens group 102 has shifted from the focusing position due to change of the diaphragm stop. Thus, the target position is updated on the basis of the focus-movement correction amount calculated in step S232.

On the other hand, if it is determined as a result of the determination in step S233 that the FCS motor is not being driven, the FCS is driven by the focus-movement correction amount (S235). As the diaphragm stop has changed, the focusing position has shifted. Thus, the position of the focus lens group 102 is moved by the focus-movement correction amount calculated in step S232.

If the FCS target position is updated in step S234 or if FCS is driven by the focus-movement correction amount in step S235, pulse to be sent is then calculated (S236). The pulse to be sent represents the number of pulses indicating the position of the focus lens to be sent to the camera body. With respect to the focusing position sent from the camera body, the focusing position is corrected on the lens barrel 100 side by the amount of change in the diaphragm. In this step, the pulse corresponding to the corrected focusing position is calculated and sent.

If the pulse to be sent is calculated in step S236, or if it is determined as a result of the determination in step S231 that the diaphragm motor is not being driven, it is then determined whether or not a communication end instruction exists (S237). In the case where communication between the camera body 200 and the lens barrel 100 ends, for example, due to power off on the camera body 200 side, a command to end communication is sent to the lens barrel 100 side before power off. Thus, in this step, it is determined whether or not an instruction to end communication exists.

If it is determined as a result of the determination in step S237 that the instruction to end communication does not exist, the flow returns to step S202. On the other hand, if it is determined as a result of the determination that the instruction to end communication exists, communication end processing is performed (S238), and the flow of lens communication ends.

As described above, in the flow of lens communication, the position of the focus lens to be moved is corrected on the basis of the diaphragm stop before the focus lens is moved (see S225 in FIG. 6), the diaphragm stop while moving the focus lens (see S111a and S117a in FIG. 4), and the amount of focal shift stored in the control-data storage section 123 (see S232 in FIG. 7). Thus, even if the focusing position is shifted in the case where the diaphragm stop of the diaphragm 106 is changed when the focus lens is moved to the focusing position, the amount of this shift is corrected, which makes it possible to shoot an in-focus image.

Furthermore, in the flow of lens communication, when the target position of the focus lens to be moved is corrected while the focus lens is moved to the focusing position based on the position of the peak contrast (S111 and S117 in FIG. 4, and S205 in FIG. 5), the diaphragm position at the time when focus is fixed, which is stored in the control-data storage section 123, is used as the diaphragm position before the focus lens is moved, and the position of the focus lens to be moved is corrected (see S232 in FIG. 7). This makes it possible to shoot an in-focus image even if the diaphragm stop has changed while the focus lens is moved to the focusing position.

Furthermore, in the flow of lens communication, upon receiving a command for diaphragm control from the camera body 200, the current diaphragm position and the current zoom position are read, and the number of drive steps required to reach the received diaphragm stop is calculated from the current diaphragm stop using the relationship between the zoom position and the opening amount of the diaphragm stored in the control-data storage section 123, and the stepping motor 112 for the diaphragm is driven (S221 to S224 in FIG. 6). This makes it possible to control the diaphragm stop to be a correct diaphragm stop regardless of the zoom position.

Furthermore, in the flow of lens communication, in the case where zoom operation is performed while the diaphragm control is performed on the basis of a command for diaphragm control received from the camera body 200, the target position of the diaphragm is updated according to a change in the focal length due to this zoom operation (S226 and S227 in FIG. 6). This makes it possible to correctly control the diaphragm stop to be the diaphragm stop instructed by the camera body 200.

Figure 8:
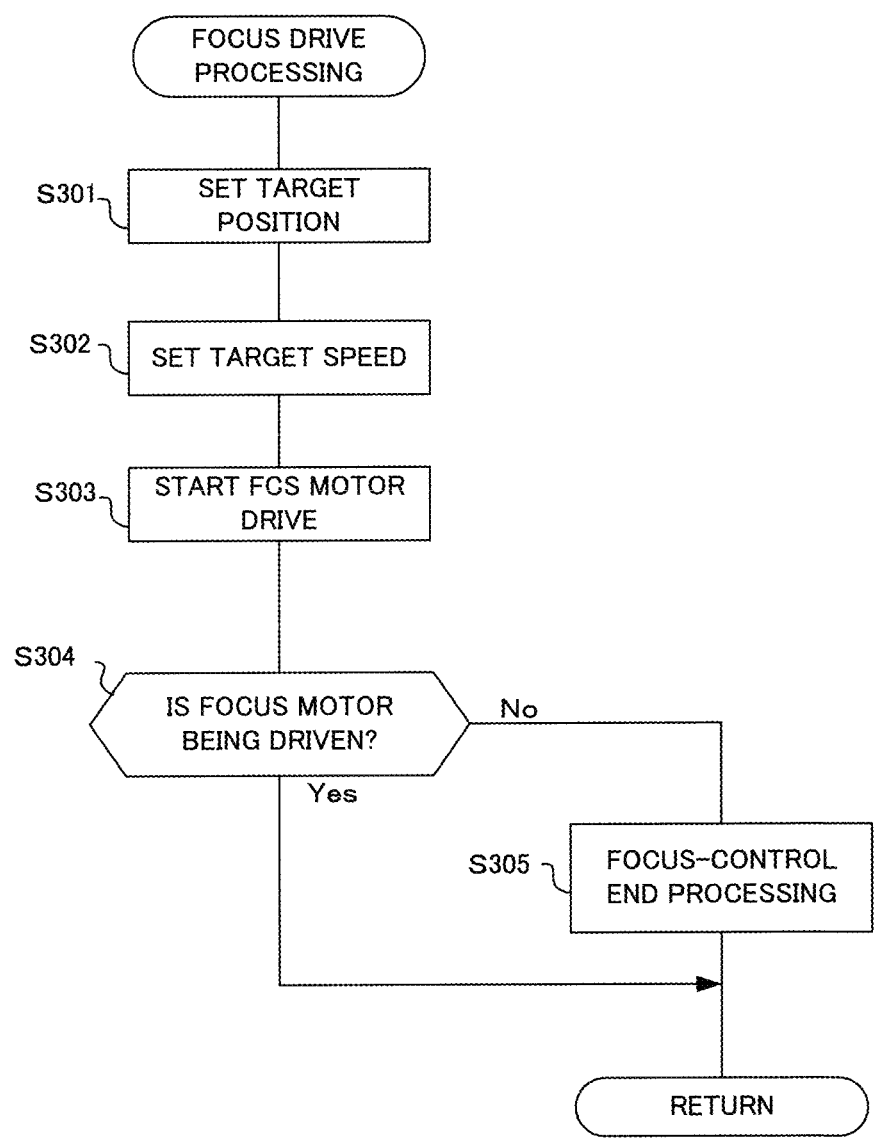
FIG. 8 is a flowchart showing operations in focus drive processing by the lens barrel according to the embodiment of the present invention.

Next, operations in the focus drive processing shown in step S205 in FIG. 5 will be described with reference to FIG. 8. When the flow of the focus drive processing is started, the target position is first set (S301), and the target speed is set (S302). In the case where a command for AF processing is sent from the camera body 200 side, a target position is also sent. Then, the focus control section 125 within the lens CPU 120 sets the number of pulses (target position) of drive of the stepping motor 111 for the FCS group required to reach the target position, and also sets the pulse rate (target speed) required to reach the target position.

After the target position and the target speed are set in step S301 and S302, respectively, drive of the FCS motor is started (S303). Here, the stepping motor 111 for the FCS group is driven through the driver 113 to start driving the focus lens group 102 toward the target position.

After drive of the FCS motor is started, it is then determined whether the focus motor is being driven or not (S304). The stepping motor 111 for the FCS group is driven by the number of steps set in step S301.

If it is determined as a result of the determination in step S304 that the focus motor is being driven, the focus drive processing is terminated and the process returns to the original flow. On the other hand, if it is determined that the focus motor is not being driven, focus-control end processing is performed (S305). Then, upon completion of this end processing, the process returns to the original flow shown.

Figure 9:
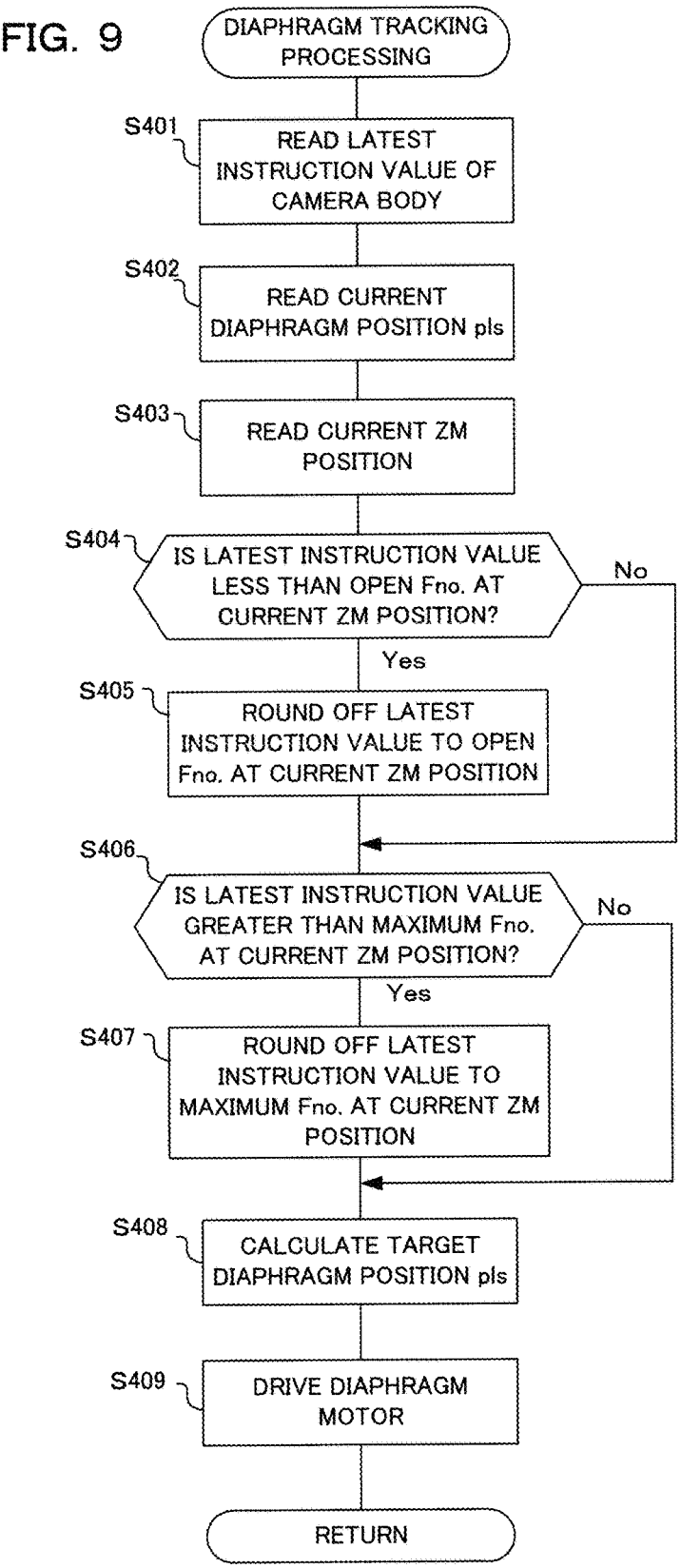
FIG. 9 is a flowchart showing operations in diaphragm tracking processing by the lens barrel according to the embodiment of the present invention.

Next, operations in the diaphragm tracking processing shown in step S229 in FIG. 6 will be described with reference to FIG. 9. When the flow of the diaphragm tracking processing is started, the latest instruction value of the camera body is read (S401). Upon receiving a command for diaphragm control from the camera body 200, the diaphragm instruction value is stored in the diaphragm control-data storage section 123 in step S225. Here, the latest diaphragm instruction value stored in the control-data storage section 123 is read.

Upon reading the latest instruction value, the current diaphragm stop (current diaphragm control pulse position) pls is then read (S402). In this embodiment, since a stepping motor is used to drive the diaphragm 106, the current diaphragm stop can be acquired based on the count value (diaphragm control pulse position) pls of the number of drive steps of the stepping motor.

After the current diaphragm stop is read, the current zoom (ZM) position is then read (S403). Here, the current zoom position is read on the basis of the output of detection by the zoom position detection section 114.

Then, it is determined whether or not the latest instruction value is less than an open Fno. at the current zoom (ZM) position (S404). The open Fno of the diaphragm 106 changes depending on the focal length, and in general, increases with an increase in the focal length. There is a possibility that the diaphragm stop from the camera body 200, which is read in step S401, cannot be set at the currently set focal length, which is read in step S403. Thus, in this step, it is determined whether or not the diaphragm 106 can be set to the diaphragm stop set on the camera body 200 side.

If it is determined as a result of the determination in step S404 that the latest instruction value is less than the open Fno. at the current ZM position, the latest instruction value is rounded off to the open Fno. at the current ZM position (S405). Here, the diaphragm stop set on the camera body 200 side cannot be set, and hence, the open Fno at the currently set focal length is set.

After the processing in step S405 is performed, or if it is determined as a result of the determination in step S404 that the latest instruction value is not less than the open Fno. at the current ZM position, it is then determined whether or not the latest instruction value is greater than the maximum Fno. at the current ZM position (S406). The size of the diaphragm 106 cannot be further stopped down from the most stopped-down state (maximum Fno.), and this maximum Fno. changes depending on the focal length. Thus, in this step, it is determined whether or not the diaphragm 106 can be set to the diaphragm stop set on the camera body 200 side.

If it is determined as a result of the determination in step S406 that the latest instruction value is greater than the maximum Fno. at the current ZM position, the latest instruction value is rounded off to the maximum Fno. at the current ZM position (S407). Here, the diaphragm stop set on the camera body 200 side cannot be set. Thus, the maximum Fno at the currently set focal length is set.

After the process in step S407 is performed, or if it is determined as a result of the determination in step S406 that the latest instruction value is not greater than the maximum Fno. at the current ZM position, the target diaphragm position (diaphragm control pulse position) pls is then calculated (S408). Here, the pls number (the number of drive steps of the stepping motor, and a difference between the target diaphragm control pulse position and the current diaphragm control pulse position) of drive required to reach the target diaphragm stop is calculated on the basis of the position of the zoom lens group stored in the diaphragm control-data storage section 123 and the diaphragm control pulse position, using the diaphragm stop instructed by the camera body, the current diaphragm stop, and the current focal length, each of which is read in steps S401 to S403.

After the target diaphragm position (diaphragm control pulse position) pls is calculated, the diaphragm motor is then driven (S409). Here, the diaphragm control section 124 performs drive control of the stepping motor 112 for the diaphragm through the driver 113 to control the diaphragm 106.

As described above, in the diaphragm tracking processing, if the focal length is changed due to the zoom operation, the opening amount (diaphragm control pulse position) of the diaphragm is controlled according to the change in the focal length so that the diaphragm stop before the focal length change is maintained. Note that the focal length is detected at predetermined time intervals, and the opening size of the diaphragm 106 is controlled at these time intervals. Note that, in the case where the camera is in video recording with the video recording button being depressed, the opening size of the diaphragm is controlled through silent operation.

Operations performed in the case where the diaphragm stop is changed during moving of the focus lens will be described with reference to timing charts shown in FIG. 10 to FIG. 13.

FIG. 10 illustrates the case where in performing the contrast AF, the diaphragm stop changes when scan drive of the focus lens is being performed. The graph 10a in FIG. 10 shows a temporal change in the diaphragm stop. The graph 10b in FIG. 10 shows a temporal change in position of the focus lens. The graph 10c in FIG. 10 shows a temporal change in the focus position. In the contrast AF, the focus lens is moved; the contrast value corresponding to each position of the focus lens is calculated (actually, calculation is made while the focus lens is driven, and the focus lens does not stop at each position); and the position of the focus lens at which the calculated contrast value takes a peak value is detected. In addition, the position of the focus lens corresponding to the detected peak value is determined to be the focusing position, and the focus lens is driven to this position of the focus lens.

In this example, at the time t11 in FIG. 10, the position of the focus lens is set to 100 [pls], the focus position is set to 1 [m], and the diaphragm 106 is set to be an open diaphragm stop (in this example, the apex value of the diaphragm stop is indicated as AV3 as shown in the graph 10a in FIG. 10). At this time t11, the focusing position is detected through the contrast AF. Thus, scan drive is started toward the target position on the infinity side (in the example shown in FIG. 10, the position of the focus lens is 5000 [pls], and the focus position is 4.9 [m]). After the scan drive is started, a contrast value is calculated at predetermined time intervals or at predetermined position intervals of the focus lens, and stored in association with the diaphragm stop of the diaphragm 106 at that time.

Furthermore, in the example shown in FIG. 10, at the time t12, the stepping motor 112 for the diaphragm starts to drive the diaphragm toward a target diaphragm stop (AV5 in this example) to perform actual shooting with the diaphragm stop (AV5). During this time, the diaphragm stop and the contrast value are stored so as to be associated with the position of the focus lens. Then, the focus-movement correction amount is calculated (S232 in FIG. 7) using the diaphragm stop before starting drive of the focus lens and the current diaphragm stop, to correct the target position of the focus lens. In the graph 10b in FIG. 10, the solid line indicates the position of the focus lens in the case where the target position is corrected, and the broken line indicates the position of the focus lens in the case where the diaphragm is not driven (the target position is not corrected). In addition, in the graph 10c in FIG. 10, the solid line indicates the focus position corresponding to the position of the focus lens in the case where the target position is corrected, and the broken line indicates the focus position in the case where the diaphragm is not driven (the target position is not corrected). Note that the diaphragm stop before starting drive of the focus lens is acquired before the starting drive of the focus lens and is stored in a memory (control-data storage section 123).

At the time t13, the diaphragm 106 reaches the target diaphragm stop (AV5 in this example). In addition, the position of the focus lens reaches the original target position (5000 [pls] in this example). However, as the diaphragm stop of the diaphragm 106 has changed, the focus position corresponding to the target position of the focus lens is moved by the focus-movement correction amount, and hence, the focus position of the focus lens corresponding to the original target position 5000 [pls] is not 4.9 [m], which is the original target, and is changed into 4.8 [m]. In this embodiment, the focus-movement correction amount is calculated using the diaphragm stop to correct the target position of the focus lens, and the focus lens is moved toward the corrected target position (6000 [pls] in this example).

At the time t14, the focus lens reaches the corrected target position (6000 [pls] in this example). This position of the focus lens is the originally targeted focus position (4.9 [m] in this example).

As described above, in this embodiment, in performing scan drive, the target position of the focus lens is corrected according to the diaphragm stop, which makes it possible to move the focus lens to the targeted focus position (focusing position). Thus, even if the diaphragm changes during the scan drive, it is possible to appropriately perform scan drive and detect contrast values over the set scan range without excess or lack in the actual scan range. In addition, the position of the focus lens at the time when a contrast value is acquired, and the diaphragm stop corresponding to this position are stored during the scan drive. Thus, by correcting the acquired contrast value according to the diaphragm stop to obtain a corrected contrast value, it is possible to appropriately judge a peak value. Therefore, it is possible to correctly perform the AF operation even if the diaphragm changes during scan drive.

Next, with reference to FIG. 11, description will be made of a case where the diaphragm stop of the diaphragm 106 changes during absolute drive. The scan drive shown in FIG. 10 represents drive to move the focus lens in order to detect a peak value of the contrast value. On the other hand, the absolute drive shown in FIG. 11 represents drive to move the focus lens to a position corresponding to the final peak position after the peak value is detected through the scan drive. In other words, the peak value of a contrast value is detected through the scan drive, and interpolation calculation is performed using three contrast values including the peak value and values immediately before and after the peak value, and positions of the focus lens corresponding to these values, whereby the position of the focus lens corresponding to the real peak value is obtained. The absolute drive represents the drive performed at the time when the focus lens is moved to the position of the focus lens corresponding to the peak value.

In FIG. 11, as in FIG. 10, the graph 20a in FIG. 11 shows a temporal change in the diaphragm stop, the graph 20b in FIG. 11 shows a temporal change in the position of a focus lens, and the graph 20c in FIG. 11 shows a temporal change in the focal position.

In this example, at the time t21 in FIG. 11, the position of the focus lens is set to 4500 [pls], the focus position is set to 4.7 [m], and the diaphragm 106 is set to an open diaphragm stop (the apex value of the diaphragm stop is set to AV3 as shown in the graph 20a in FIG. 11 in this example). Here, the diaphragm stop at the time when focus is fixed is set as the open diaphragm stop (AV3). At this time t21, the position of the focus lens corresponding to the peak value is calculated using an interpolation method through the scan drive to obtain the position of the focus lens corresponding to the interpolated peak value. Then, absolute drive is started by using this position as the target position (the position of the focus lens is 5000 [pls] and the focus position is 4.9 [m] in this example).

Furthermore, in the example shown in FIG. 11, at the time t22, actual shooting is performed with the diaphragm stop (AV5 in this example), and hence, the stepping motor 112 for the diaphragm is started to drive the diaphragm toward the target diaphragm stop (AV5). In the graph 20b in FIG. 11, the solid line indicates the position of the focus lens in the case where the target position is corrected, and the broken line indicates the position of the focus lens in the case where the diaphragm is not driven (the target position is not corrected). Furthermore, in the graph 20c in FIG. 11, the solid line indicates the focus position corresponding to the position of the focus lens in the case where the target position is corrected, and the broken line indicates the focus position in the case where the diaphragm is not driven (the target position is not corrected).

At the time t23, the diaphragm 106 reaches the target diaphragm stop (AV5 in this example). In addition, the position of the focus lens reaches the original target position (5000 [pls] in this example). However, as the diaphragm stop of the diaphragm 106 has changed, the focus position corresponding to the target position of the focus lens is moved by the focus-movement correction amount. This leads to a change in the focus position from the original target of 4.9 [m] into 4.85 [m]. Thus, in this embodiment, for the targeted position (5000 [pls] in this example) of the focus lens, the focus-movement correction amount is calculated using the diaphragm stop at the time of peak detection and the current diaphragm stop (S232 in FIG. 7) to correct the target position to be the originally targeted focus position of 4.9 [m] (5100 [pls] in this example), and further the focus lens is driven. Note that, for the diaphragm stop at the time of peak detection, the diaphragm stop at the time when the peak is detected on the body side during the scan drive is stored as the stored diaphragm position, and is sent from the body side to the lens side (S111a and 117a in FIG. 4). In addition, the stored diaphragm stop, together with a command for absolute drive to the focusing position, may be sent from the body side to the lens side.

At the time t24, the focus lens reaches the corrected target position (5100 [pls] in this example). This position of the focus lens is the originally targeted focus position (4.9 [m] in this example).

As described above, in this embodiment, at the time of the absolute drive, the target position of the focus lens is corrected according to the stop. Thus, it is possible to move the focus lens to the targeted focus position (focusing position). More specifically, even if a user operates to change the diaphragm during the absolute drive operation, it is possible to appropriately perform focus operation to achieve the focusing state.

Next, with reference to FIG. 12, description will be made of a case where the diaphragm operation is performed when shooting operation is performed in a focusing state, and the diaphragm stop changes. Note that, in FIG. 12, as in FIG. 10, the graph 30a in FIG. 12 shows a temporal change in the diaphragm stop, the graph 30b in FIG. 12 shows a temporal change in the position of the focus lens, and the graph 30c in FIG. 12 shows a temporal change in the focus position.

In FIG. 12, at the time t31, the diaphragm starts a stop-down operation. Then, at the time t32, the diaphragm is stopped down to the target diaphragm stop. During the time of t32 to t33, actual exposure is performed, and during this period of time, the imaging section 202 captures image data for recording. At the time t33, actual exposure ends, and the diaphragm starts drive toward the open state, and the diaphragm becomes the open state at the time t34.

In the graphs 30b and 30c in FIG. 12, the solid line indicates the position of the focus lens and the focus position in the case where the amount of focus movement is corrected. Furthermore, the broken line indicates the position of the focus lens and the focus position in the case where the amount of focus movement is not corrected.

As shown by the broken lines in the graphs 30b and 30c in FIG. 12, as the diaphragm stop of the diaphragm changes, the focus position changes. Thus, the position of the focus lens is moved according to a change in the diaphragm stop so as to maintain the focusing state. Here, it is assumed that the distance to the subject is 1 m, in other words, the focus position at which the subject is in focus is 1 m. Furthermore, it is assumed that, as the diaphragm is set from the open position to AV5, the focus position is shifted from 1 m to 1.1 m due to the effect of, for example, optical aberration. In the case where, in such a state, the diaphragm stop is changed during actual exposure as shown in the graph 30a in FIG. 12, and the position of the focus lens is not moved according to the change in the diaphragm stop as shown by the broken line in the graph 30b in FIG. 12, the focus position is changed into 1.1 m as shown by the broken line in the graph 30c in FIG. 12. Thus, an out-of-focus image is shot during the actual exposure.

In the example shown in FIG. 12, the amount of focus movement is corrected (shown by the solid line), and the position of the focus lens is changed during the time of t31 to t34 (see the graph 30b in FIG. 12), whereby the focus position is kept constant (1 m) (see the graph 30c in FIG. 12). On the other hand, in the case where the amount of focus movement is not corrected (shown by the broken line), the position of the focus lens is not changed during the time of t31 to t34 (see the graph 30b in FIG. 12). Thus, the focus position during the actual exposure changes from 1 m to 1.1 m (see the graph 30c in FIG. 12). In other words, an out-of-focus image is shot.

Next, with reference to FIG. 13, description will be made of a case where the diaphragm stop of the diaphragm 106 is changed during wobbling drive. Note that, in FIG. 13, as in FIG. 10, the graph 40a in FIG. 13 shows a temporal change in the diaphragm stop, the graph 40b in FIG. 13 shows a temporal change in the position of the focus lens, and the graph 40c in FIG. 13 shows a temporal change in the focus position.

In the case of the AF processing (S117) performed during video shooting on the camera body 200 side (Yes in S107, and S116 to S121 in FIG. 4), focus detection through the contrast AF is performed while the wobbling drive is performed. In other words, during the contrast AF, in the case where the focus is shifted and the contrast value reduces, the driven direction of the focus lens to achieve focusing is not stably determined. For this reason, the focus lens is driven forward and backward along the optical axis direction in a predetermined amplitude with a certain point as the center (this drive is referred to as a wobbling drive), and the driving direction is determined on the basis of the difference in contrast values acquired at both end points in this amplitude. In addition, by moving the center position of the wobbling drive so that contrast values at both end points on front and rear sides in the optical axis are made equal in the wobbling drive, it is possible to keep the focusing state while performing the wobbling drive. These operations are also referred to the wobbling drive.

In the example shown in FIG. 13, at the time t41, the wobbling drive starts from the current position (100 [pls]) of the focus lens and the current focus position (1 [m]) toward the position (5000 [pls]) of the focus lens and the focus position (5 [m]), each of which is the final targeted position. Thus, as shown in the graph 40b and the graph 40c in FIG. 13, the focus lens is driven toward the target position while being slightly moved forward and backward in the optical axis direction.

At the time t42, stop-down of the diaphragm toward the target value is started, and the target value of the diaphragm is reached at the time t43. During this time, as the diaphragm stop of the diaphragm 106 changes, the focus position shifts as shown by the broken line in the graph 40c in FIG. 13. Furthermore, the wobbling drive of the focus lens is continued, and at the time t44, the wobbling drive is stopped. In addition, during the wobbling drive, image data is taken by the imaging section 202 at both ends of the wobbling operation and the contrast value is calculated and stored in, for example, a memory so as to be associated with the position of the focus lens and the diaphragm stop.

In the graph 40b and the graph 40c in FIG. 13, the solid line indicates the position of the focus lens and the focus position in the case where the amount of focus movement is corrected. Furthermore, the broken line indicates the position of the focus lens and the focus position in the case where the amount of focus movement is not corrected.

As can be understood from FIG. 13, as the diaphragm stop of the diaphragm changes, the focus position changes. Thus, the focus-movement correction amount is calculated according to the change in the diaphragm stop, and drive of the focus lens which is corrected with this focus-movement correction amount is performed.

In the example shown in FIG. 13, if the amount of focus movement is not corrected (shown by the broken line), the wobbling drive is performed during the time of t42 to t44 (see the graph 40b in FIG. 13). However, the position of the focus lens is shifted from the targeted position of the focus lens, and hence, it is not possible to acquire an appropriate contrast value. In addition, the focus lens does not reach the targeted focus position at time t44 (see the graph 40c in FIG. 13). On the other hand, by correcting the amount of focus movement (shown by the solid line), the position of the focus lens changes during the time of t42 to t44 (see the graph 40b in FIG. 13), and the focus lens reaches the targeted focus position at the time t44 (see the graph 40c in FIG. 13). By correcting the amount of focus movement according to a diaphragm operation to correct the position of the focus lens, it is possible to perform targeted wobbling drive to acquire the contrast value at an appropriate position of the focus lens. Thus, it is possible to detect the focusing position without being affected by a change in the diaphragm stop due to the diaphragm operation. In addition, the contrast values acquired during the wobbling drive are each stored so as to be associated with the diaphragm stop. Thus, it may be possible to correct the acquired contrast value using the diaphragm stop to obtain a corrected contrast value. Furthermore, by determining the driving direction of the focus lens toward focusing by use of the corrected contrast value, it is possible to appropriately make determination, and to reduce the time required to achieve the focusing.

Thus, as can be understood from the timing charts shown in FIG. 10 to FIG. 13, in this embodiment, in the case where the diaphragm stop has changed during movement of the focus lens, the focus-movement correction amount is calculated according to the change in the diaphragm stop, and the drive target position of the focus lens is corrected on the basis of this focus-movement correction amount. Thus, even if the diaphragm stop has changed, it is possible to acquire a through image or recorded image with an in-focus image.

Note that, in the absolute drive shown in FIG. 11, after the peak of the contrast value is detected through the contrast AF, the position of the focus lens corresponding to the actual peak value is calculated using an interpolation method, and the focus lens is driven to the calculated position of the focus lens. However, the present embodiment can be applied not only to this, but for example, to the case where a photographer sets an absolute value of a shooting distance, and driving is performed toward this shooting distance.

As described above, according to the embodiment of the present invention, the position of the focus lens to be moved is corrected on the basis of: the diaphragm position before the focus lens is moved; the diaphragm position while moving the focus lens; and the amount of focal shift stored in the storage section (S232, S234, and S235 in FIG. 7). Thus, it is possible to reduce movement of the focusing position based on a change in the diaphragm stop, regardless of the diaphragm stop, and improve usability.

It should be noted that, in an embodiment according to the present invention, description has been made of a case in which the contrast AF is used as an AF method as an example. However, the AF method is not limited to this, and the present invention can be applied even if a phase-difference AF or another AF method is employed.

Furthermore, this embodiment has been described using a digital camera as a device for shooting. However, for the camera, it may be possible to use a digital single-lens reflex camera or compact digital camera, or also use a camera for moving pictures such as a video camera, and a movie camera, or also use a camera embedded, for example, in a mobile phone, a smartphone, a personal digital assist (PDA), a personal computer (PC), a tablet computer, or a gaming device. In any case, the present invention can be applied to any device, provided that such a device includes a diaphragm stop changing at the time of operating automatic focus adjustment.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A shooting apparatus including a photographing optical system having a variable aperture diaphragm, and an imaging section that images a light flux passing through the photographing optical system to output an image signal, the shooting apparatus comprising:
   a diaphragm position detection section that detects a diaphragm position corresponding to the aperture diaphragm in the photographing optical system;
   a lens control section that controls movement of a focus lens included in the photographing optical system;
   a storage section that stores an amount of focal shift in the photographing optical system corresponding to the diaphragm position; and
   a focus detection section that detects a position of the focus lens at which a contrast value based on the image signal indicates a peak, wherein
   the lens control section, while moving the focus lens to a focusing position based on the position which is detected by the focus detection section and at which the contrast value indicates the peak, corrects a position of the focus lens to be moved, on the basis of a diaphragm position when the focus detection section detects the position at which the contrast value indicates the peak, a diaphragm position while moving the focus lens, and the amount of focal shift stored in the storage section.

2. The shooting apparatus according to claim 1, wherein, when the focus detection section detects a position at which a contrast indicates a peak, on the basis of the image signal outputted by the imaging section while the lens control section performs scan drive for moving the focus lens in a predetermined range, the lens control section changes the predetermined range on the basis of a diaphragm position before the scan drive is performed, a diaphragm position while moving the focus lens, and the amount of focal shift stored in the storage section.

3. The shooting apparatus according to claim 2, wherein the lens control section, when performing the scan drive, stores corresponding position of the focus lens and diaphragm position when the focus detection section detects the contrast value, corrects the contrast value according to the stored diaphragm position, and detects a position at which the contrast value indicates a peak.

4. A camera system including an interchangeable lens with a photographing optical system having a variable aperture diaphragm, and a camera body to and from which the interchangeable lens is attachable and detachable, the camera system comprising:
   in the interchangeable lens,
      a diaphragm position detection section that detects a diaphragm position corresponding to the aperture diaphragm in the photographing optical system;
      a lens control section that controls movement of a focus lens included in the photographing optical system; and
      a storage section that stores an amount of focal shift in the photographing optical system corresponding to the diaphragm position, and
   in the camera body:
      a main body control section that communicates with the lens control section; and
      a diaphragm position storage section that stores the diaphragm position sent by the lens control section and received by the main body control section, wherein
   the main body control section sends the stored diaphragm position stored in the diaphragm position storage section and a target position to which the focus lens is moved, to the lens control section, and
   the lens control section, while moving the focus lens to the target position, corrects the target position of the focus lens to be moved, on the basis of the stored diaphragm position, a diaphragm position while moving the focus lens, and the amount of focal shift stored in the storage section.

5. The camera system according to claim 4, wherein the camera body includes:
   an imaging section that images a light flux passing through the photographing optical system to generate an image signal; and a focus detection section that detects a contrast value on the basis of the image signal, and wherein the stored diaphragm position indicates a diaphragm position detected by the diaphragm position detection section when a peak of the contrast value is detected by detecting the contrast value while moving the focus lens.

6. The camera system according to claim 4, wherein the stored diaphragm position indicates a diaphragm position detected by the diaphragm position detection section when the main body control section fixes a focusing state.

7. The camera system according to claim 6, wherein the camera body includes:

an imaging section that images a light flux passing through the photographing optical system to generate an image signal; and a focus detection section that detects a contrast value on the basis of the image signal, and wherein the focus detection section, while moving the focus lens on the basis of a predetermined center position and a predetermined amplitude by the lens control section, fixes a focusing state by performing a wobbling operation to detect a contrast value on the basis of an image signal imaged by the imaging section at an end point of the amplitude.

* * * * *